United States Patent
van Hoff et al.

(10) Patent No.: US 9,363,569 B1
(45) Date of Patent: Jun. 7, 2016

(54) VIRTUAL REALITY SYSTEM INCLUDING SOCIAL GRAPH

(71) Applicant: Jaunt Inc., Palo Alto, CA (US)

(72) Inventors: Arthur van Hoff, Palo Alto, CA (US);
Thomas M. Annau, Palo Alto, CA (US);
Jens Christensen, Palo Alto, CA (US)

(*) Notice: Subject to any disclaimer, the term of this patent is extended or adjusted under 35 U.S.C. 154(b) by 0 days.

(21) Appl. No.: 14/845,137

(22) Filed: Sep. 3, 2015

Related U.S. Application Data

(63) Continuation-in-part of application No. 14/444,938, filed on Jul. 28, 2014, and a continuation-in-part of application No. 14/726,118, filed on May 29, 2015, and a continuation-in-part of application No. 14/842,465, filed on Sep. 1, 2015.

(60) Provisional application No. 62/055,259, filed on Sep. 25, 2014, provisional application No. 62/142,909, filed on Apr. 3, 2015.

(51) Int. Cl.
| | |
|---|---|
| H04N 5/77 | (2006.01) |
| H04N 13/02 | (2006.01) |
| H04N 13/04 | (2006.01) |
| H04N 21/4788 | (2011.01) |
| H04N 21/4223 | (2011.01) |
| H04N 21/81 | (2011.01) |
| H04N 21/2668 | (2011.01) |
| H04N 21/442 | (2011.01) |

(52) U.S. Cl.
CPC ....... *H04N 21/4788* (2013.01); *H04N 21/2668* (2013.01); *H04N 21/4223* (2013.01); *H04N 21/44218* (2013.01); *H04N 21/812* (2013.01); *H04N 21/816* (2013.01)

(58) Field of Classification Search
CPC ............ G06F 3/04815; G06F 3/04847; G06Q 30/0263; G06T 2207/10012; G06T 2207/20228; G06T 3/4038; G06T 7/0022; G11B 27/11; G11B 27/34; G11B 31/006; G11B 27/031; H04N 13/0007; H04N 13/0022
USPC .............. 386/201, 223, 224, 341; 348/36–39, 348/42–60, 218.1, 153, 159, 211.11
See application file for complete search history.

(56) References Cited

U.S. PATENT DOCUMENTS

| | | | | |
|---|---|---|---|---|
| 6,767,287 | B1* | 7/2004 | Mcquaid ................. | A63F 13/12 463/29 |
| 7,155,680 | B2* | 12/2006 | Akazawa ............ | G06F 3/04815 715/706 |
| 8,478,111 | B2* | 7/2013 | Stankiewicz ......... | G06K 9/4671 386/278 |
| 2004/0027451 | A1* | 2/2004 | Baker ................... | H04N 5/2259 348/46 |
| 2004/0066449 | A1* | 4/2004 | Givon .................... | G03B 35/00 348/48 |
| 2005/0062869 | A1* | 3/2005 | Zimmermann ........ | G02B 13/06 348/335 |
| 2009/0249244 | A1* | 10/2009 | Robinson .............. | G06F 3/0481 715/781 |
| 2012/0218296 | A1* | 8/2012 | Belimpasakis ......... | G06T 17/05 345/633 |

(Continued)

*Primary Examiner* — Thai Tran
*Assistant Examiner* — Stephen Smith
(74) *Attorney, Agent, or Firm* — Burbage Law, P.C.; Jon Burbage

(57) ABSTRACT

The disclosure includes a system and method for receiving viewing data that describes a location of a first user's gaze while viewing virtual reality content. The method also determining an object of interest in the virtual reality content based on the location of the first user's gaze. The method also includes generating a social network that includes the first user as a member of the social network. The method also includes performing an action in the social network related to the object of interest.

22 Claims, 18 Drawing Sheets

(56) References Cited

U.S. PATENT DOCUMENTS

| | | | |
|---|---|---|---|
| 2013/0031475 A1* | 1/2013 | Maor | A63F 13/12 715/706 |
| 2013/0054576 A1* | 2/2013 | Karmarkar | G06F 3/013 707/722 |
| 2013/0103624 A1* | 4/2013 | Thieberger | G06N 99/005 706/12 |
| 2013/0235347 A1* | 9/2013 | Hennessey | G06F 3/013 351/210 |
| 2014/0089097 A1* | 3/2014 | Byun | G06Q 30/0267 705/14.64 |
| 2014/0099623 A1* | 4/2014 | Amit | G09B 7/00 434/350 |
| 2014/0184550 A1* | 7/2014 | Hennessey | G06F 3/013 345/173 |
| 2014/0201126 A1* | 7/2014 | Zadeh | G06K 9/627 706/52 |
| 2014/0280549 A1* | 9/2014 | Rajan | H04L 67/306 709/204 |
| 2014/0310630 A1* | 10/2014 | Asikainen | G01C 21/206 715/771 |
| 2014/0359656 A1* | 12/2014 | Banica | H04N 21/812 725/32 |
| 2015/0012827 A1* | 1/2015 | Elmeih | G06F 3/04842 715/719 |
| 2015/0199006 A1* | 7/2015 | He | A61B 3/113 345/158 |
| 2015/0206329 A1* | 7/2015 | Devries | G06T 11/00 345/633 |
| 2015/0208131 A1* | 7/2015 | Chatter | H04N 21/47815 725/60 |
| 2015/0235434 A1* | 8/2015 | Miller | G06T 19/006 345/633 |
| 2015/0264092 A1* | 9/2015 | Herger | H04L 65/403 709/204 |
| 2015/0316982 A1* | 11/2015 | Miller | G06F 3/011 345/156 |
| 2015/0317353 A1* | 11/2015 | Zavesky | G06F 17/30386 707/736 |

\* cited by examiner

VIRTUAL REALITY SYSTEM INCLUDING SOCIAL GRAPH

CROSS-REFERENCE TO RELATED APPLICATIONS

This application claims the benefit of U.S. Provisional Patent Application No. 62/055,259, entitled "Virtual Realty System Including Social Graph," filed Sep. 25, 2014. This application also claims the benefit of U.S. Provisional Patent Application No. 62/142,909, entitled "Image Stitching." filed Apr. 3, 2015. This application is a continuation-in-part of U.S. Utility patent application Ser. No. 14/444,938, entitled "Camera Array Including Camera Modules" filed Jul. 28, 2014. This application is a continuation-in-part of U.S. Utility patent application Ser. No. 14/726,118, entitled "Camera Array Including Camera Modules" filed May 29, 2015. This application is a continuation-in-part of U.S. Utility patent application Ser. No. 14/842,465, entitled "Virtual Realty System Including Social Graph" filed Sep. 1, 2015. In addition, this application is related to: U.S. Provisional Patent Application No. 62/004,645, titled "Camera Array Including Camera Modules," filed May 29, 2014; U.S. Provisional Patent Application No. 62/008,215, entitled "Color Consensus," filed Jun. 5, 2014; U.S. Utility patent application Ser. No. 14/465,575, entitled "Aggregating Images and Audio Data to Generate Virtual Reality Content" filed Aug. 21, 2014; and U.S. Utility patent application Ser. No. 14/465,570, entitled "Generating Content for a Virtual Reality System" filed Aug. 21, 2014. Each of the foregoing patent applications is herein incorporated in its entirety by reference.

FIELD

The embodiments discussed herein are related to a virtual presence system and method. More particularly, the embodiments discussed herein relate to a virtual reality (VR) system including integration with one or more social graphs.

BACKGROUND

As technology improves, people become more isolated from human-to-human interaction. Instead of interacting with people in the physical world, people become more interested in the changes occurring on their phones and other mobile devices. This can result in loneliness and a sense of being disconnected.

One way to reduce the feelings of isolation comes from using virtual reality systems. In a virtual reality system, users interact with visual displays generated by software to experience a new location, activity, etc. For example, the user may play a game and interact with other characters in the game. In another example, the government is currently using virtual reality systems to train pilots. Current systems, however, fail to completely remedy feelings of isolation because the VR systems are insufficiently realistic.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one innovative aspect of the subject matter described in this disclosure, a system includes one or more processors and one or more non-transitory tangible computer-readable mediums communicatively coupled to the one or more processors and storing executable instructions executable by the one or more processors to perform operations including: receiving viewing data that describes a location of a first user's gaze while viewing virtual reality content, determining an object of interest in the virtual reality content based on the location of the first user's gaze, generating a social network that includes the first user as a member of the social network, and performing an action in the social network related to the object of interest.

Other aspects include corresponding methods, systems, apparatus, and computer program products for these and other innovative aspects.

These and other embodiments may each optionally include one or more of the following operations and features. For instance, performing the action in the social network comprises: identifying one or more second users in the social network that are associated with the object of interest and suggesting a connection between the first user and the one or more second users in the social network; identifying one or more second users in the social network that are associated with the object of interest and inviting the one or more second users to join the first user in interacting with the virtual reality content; determining a category associated with the object of interest, determining one or more advertisements that correspond to the category, providing the one or more advertisements as part of the virtual reality content, updating a user profile associated with the first user to include information about at least one of the category and the one or more advertisements, and storing information in a social graph about the first user's gaze at advertisements displayed as part of the virtual reality content; and determining a category associated with the object of interest and suggesting a group associated with the social network based on the category. The operations may further include transmitting instructions to physical hardware to vibrate to provide physical stimulation. Determining the object of interest may include a heat map that measures a user's gaze at different locations in the virtual reality content and illustrates the user's gaze with different colors based on a length of time the user spent looking at the different locations.

According to another innovative aspect of the subject matter described in this disclosure, a system includes one or more processors and one or more non-transitory tangible computer-readable mediums communicatively coupled to the one or more processors and storing executable instructions executable by the one or more processors to perform operations including: providing virtual reality content that includes a compressed stream of three-dimensional video data and a stream of three-dimensional audio data with a processor-based computing device programmed to perform the providing, determining locations of user gaze of the virtual reality content, and generating a heat map that includes different colors based on a number of user gazes for each location. Optionally, the stream of audio data may be compressed.

These and other embodiments may each optionally include one or more of the following operations and features. For instance, the operations may include: generating a playlist of virtual reality experiences based on most user views of virtual reality content, generating a playlist of virtual reality experiences based on a geographical location, and generating a playlist of virtual reality experiences, wherein the playlist is generated by a user that is an expert in subject matter and the playlist is based on the subject matter.

According to another innovative aspect of the subject matter described in this disclosure, a system includes one or more processors and one or more non-transitory tangible computer-readable mediums communicatively coupled to the one or more processors and storing executable instructions executable by the one or more processors to perform operations including: generating, with one or more processors, virtual reality content that includes a stream of three-dimensional video data and a stream of three-dimensional audio data, providing the virtual reality content to a user, determining the location of the user's gaze, and determining one or more advertisements that correspond to the location of the user's gaze; analyzing the virtual reality content to identify a stitching aberration in the virtual reality content, incorporating an advertisement into the virtual reality content such that the stitching aberration is not visible, and providing the virtual reality content with the advertisement to the user, determining a cost for displaying each of the one or more advertisements based on a location of the one or more advertisements in the virtual reality content and a category associated with each of the one or more advertisements and suggesting a first advertisement from the one or more advertisements based on the cost; wherein determining the cost for displaying the one or more advertisements is further based on a length of time that the user gazes at the location; providing a graphical object as part of the virtual reality content that is linked to a second advertisement, receiving a selection of the second advertisement from the user, and generating a pop-up window in the virtual reality content or providing access to a third-party website; and generating graphics for displaying a bottom portion and a top portion that include at least some of the virtual reality content and providing the one or more advertisements that are part of at least the bottom portion or the top portion.

The object and advantages of the embodiments will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Example Use Case

Figure 1:
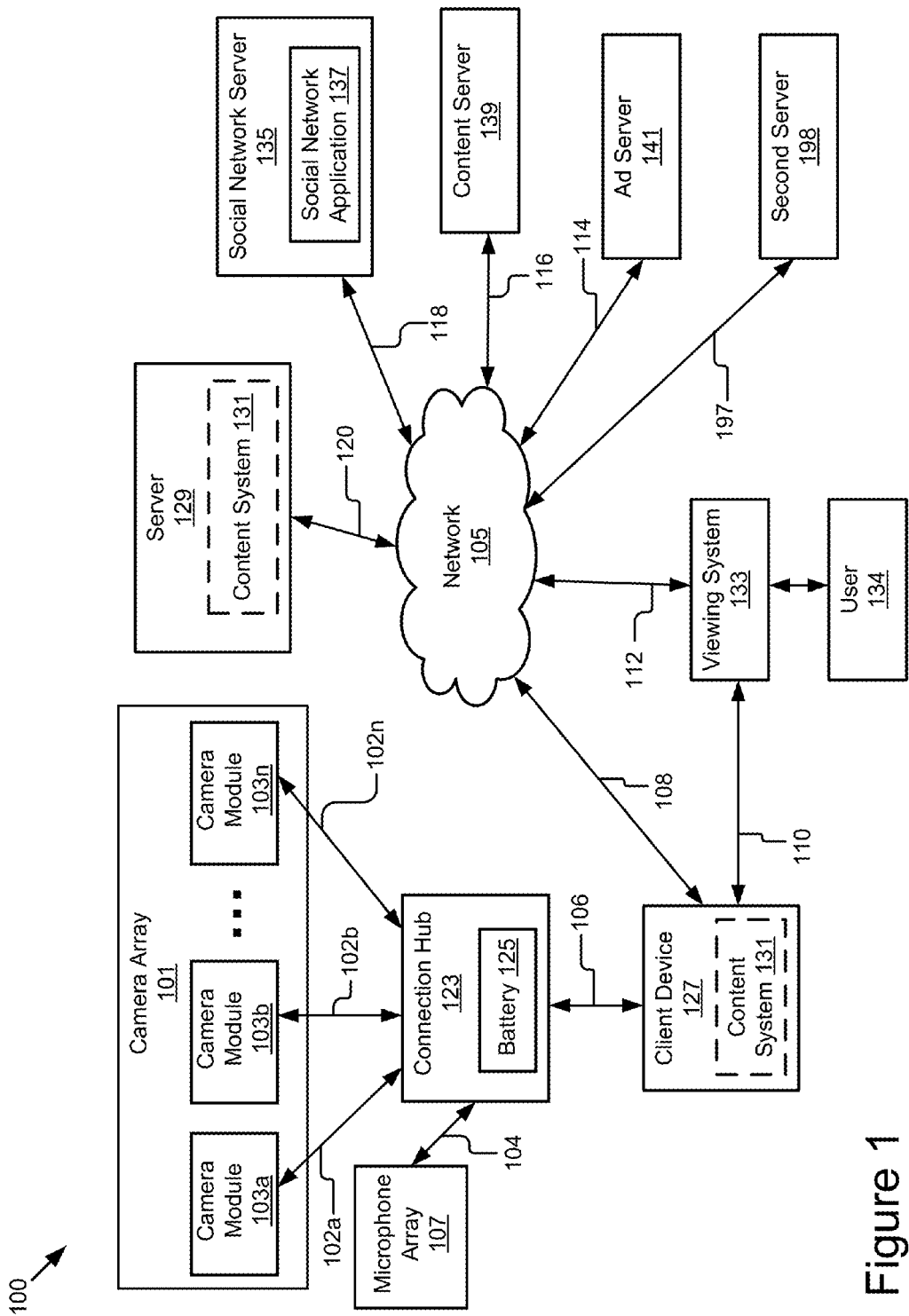
FIG. 1 illustrates a block diagram of some embodiments of an example system for generating content for a virtual reality system.

A virtual reality experience may include one that creates a realistic sense of being in another place. Creating such an experience may involve reproducing three-dimensional ("3-D") video and optionally 3-D audio for a scene. For example, imagine a user is standing in a forest with a canopy of tree limbs overhead. The user may see trees, rocks, and other objects in various directions. As the user rotates his or her head from side to side and/or up and down, disparity (e.g., shifts in position) of the objects provides the user with depth perception, e.g., the ability to generally perceive the distance to an object in the field of view and/or the distance between objects in the field of view. The user may sense that there is a creek or river behind him or her because the user may hear running water. As the user tilts his or her head to the side, the user's view of the creek or river changes and the sound of the water changes. The creek or river may be easier to see and/or the sound of the water may become more distinct and clearer, and the user has a better sense of how far the water is from the user and how fast the water is flowing. In the canopy of tree limbs above the user, a bird is singing. When the user tilts his or her head upward, the user's senses detect changes in the surrounding environment: the user may see the canopy; the user may see a bluebird singing; the user may have a sense of how far away the bird is based on disparity; and the user may hear the bird's singing more distinctly and loudly since the user is now facing the bird. The user tilts his or her head back to a forward-facing position and now the user may be facing a deer that is standing just 10 feet away from the user. The deer starts to run toward the user and the user's depth perception indicates that the deer is getting closer to the user. Based on the user's depth perception and the relative position of objects around the deer, the user may tell that the deer is running toward him or her at a fast pace.

In some embodiments, a system described herein may include a camera array, a microphone array, a content system, a viewing system, and other devices, systems, or servers. The system is applicable for recording and presenting any event including, but not limited to, a concert, a sports game, a wedding, a press conference, a movie, a promotion event, a video conference, or other event or scene that may be recorded by the camera array and the microphone array. The recording of the event or scene may be viewed through a virtual reality display (e.g., a pair of virtual reality goggles) during occurrence of the event or thereafter.

Camera modules included in the camera array may have lenses mounted around a spherical housing and oriented in different directions with a sufficient diameter and field of view, so that sufficient view disparity may be captured by the camera array for rendering stereoscopic images. In some embodiments, one of the camera modules is a master camera module that dictates the start and stop of recording of video data. The camera array may output raw video data describing image frames with different viewing directions to the content system.

The microphone array is capable of capturing sounds from various directions. The microphone array may output the captured sounds and related directionalities to the content system, which allows the content system to reconstruct sounds from any arbitrary direction.

The content system may aggregate raw video data outputted from the camera array and raw audio data outputted from the microphone array for processing and storage. In some embodiments, the content system may include a set of Gigabit Ethernet switches for collecting the raw video data and an audio interface for collecting the raw audio data. Both of the raw video data and audio data may be fed into a client device or a server with a storage device for storing the raw video data and audio data.

The content system may include code and routines stored on a non-transitory memory for processing the raw video data and audio data received across multiple recording devices and for converting the raw video data and audio data into a single compressed stream of 3D video and audio data. For example, the content system may include code and routines that, when executed by a processor, stitch the image frames from multiple camera modules into two panoramic 3D video streams for left and right eye viewing, such as a stream of left panoramic images for left eye viewing (also referred to as a left stream of panoramic images) and a stream of right panoramic images for right eye viewing (also referred to as a right stream of panoramic images). The streams of left and right panoramic images are configured to create a time-varying panorama viewed by a user using the viewing system.

In some embodiments, the content system may construct a stereoscopic panorama using image frames from multiple views each in a different direction. For example, the camera array includes multiple camera modules arranged around all 360 degrees of a sphere. The camera modules each have a lens pointing in a different direction. Because the camera modules are arranged around 360 degrees of a sphere and taking images of the scene from multiple viewpoints, the images captured by the camera modules at a particular time include multiple views of the scene from different directions. The resulting left or right panoramic image for the particular time includes a spherical representation of the scene at the particular time. Each pixel in the left or right panoramic image may represent a view of the scene in a slightly different direction relative to neighboring pixels.

In some embodiments, the content system generates, based on a left camera map, the stream of left panoramic images for left eye viewing from image frames captured by the camera array. The left camera map identifies a corresponding matching camera module for each pixel in a left panoramic image. A pixel in a panoramic image may correspond to a point in a panoramic scene, and a matching camera module for the pixel in the panoramic image may be a camera module that has a lens with a better view for the point than other camera modules. The left camera map may map pixels in a left panoramic image to corresponding matching camera modules. Similarly, the content system generates, based on a right camera map, the stream of right panoramic images for right eye viewing from image frames captured by the camera array. The right camera map identifies a corresponding matching camera module for each pixel in a right panoramic image. The right camera map may map pixels in a right panoramic image to corresponding matching camera modules.

The content system may also include code and routines that, when executed by a processor, correct camera calibration errors, exposure or color deficiencies, stitching artifacts, and other errors on the left and right panoramic images.

The content system may also add four-channel ambisonic audio tracks to the 3D video streams, and may encode and compress the 3D video and audio streams using a standard moving picture experts group (MPEG) format or other suitable encoding/compression format.

In some embodiments, the content system includes code and routines configured to filter the 3D video data to improve its quality. The content system may also include code and routines for intentionally changing the appearance of the video with a video effect. In some embodiments, the content system includes code and routines configured to determine an area of interest in a video for a user and to enhance the audio corresponding to the area of interest in the video.

The viewing system decodes and renders the 3D video and audio streams received from the content system on a virtual reality display device (e.g., a virtual reality display) and audio reproduction devices (e.g., headphones or other suitable speakers). The virtual reality display device may display left and right panoramic images for the user to provide a 3D immersive viewing experience. The viewing system may include the virtual reality display device that tracks the movement of a user's head. The viewing system may also include code and routines for processing and adjusting the 3D video data and audio data based on the user's head movement to present the user with a 3D immersive viewing experience, which allows the user to view the event or scene in any direction. Optionally, 3D audio may also be provided to augment the 3D viewing experience.

Once the virtual reality content is generated, there are many applications for the virtual reality content. In one embodiment, the content system generates advertisements within the virtual reality. For example, the advertisements are displayed in areas that are unobtrusive, such as above the user or below the user. The virtual reality system may be able to determine how to charge for the advertisements based on a location of the user's gaze. In another embodiment, the content system communicates with a social network application to identify users for using the virtual reality content together, for generating virtual reality updates for the user's friends on the social network, for suggesting content to the user based on the user's interest in certain virtual reality subject matter, etc. In yet another embodiment, the virtual reality system determines overall usage information such as a heat map of user gazes and a playlist of virtual reality experiences.

Embodiments of the disclosure will be explained with reference to the accompanying drawings.

Example System

FIG. 1 illustrates a block diagram of some embodiments of an example system 100 that collects and aggregates image frames and audio data to generate virtual reality content, arranged in accordance with at least some embodiments described herein. The illustrated system 100 includes a camera array 101, a connection hub 123, a microphone array 107, a client device 127, and a viewing system 133. In some embodiments, the system 100 additionally includes a server 129, a social network server 135, a content server 139, an advertisement (ad) server 141, and a second server 198. The client device 127, the viewing system 133, the server 129, the social network server 135, the content server 139, the second server 198, and the ad server 141 may be communicatively coupled via a network 105.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the present disclosure, as will be appreciated in view of the disclosure.

While FIG. 1 illustrates one camera array 101, one connection hub 123, one microphone array 107, one client device 127, one server 129, one social network server 135, one content server 139, one ad server 141, one second server 198, and one viewing system 133, the disclosure applies to a system architecture having one or more camera arrays 101, one or more connection hubs 123, one or more microphone arrays 107, one or more client devices 127, one or more servers 129, one or more social network servers 135, one or more content servers 139, one or more ad servers 141, one or more second servers 198, and one or more viewing systems 133. Furthermore, although FIG. 1 illustrates one network 105 coupled to the entities of the system 100, in practice one or more networks 105 may be connected to these entities and the one or more networks 105 may be of various and different types.

The camera array 101 may be a modular camera system configured to capture raw video data that includes image frames. In the illustrated embodiment shown in FIG. 1, the camera array 101 includes camera modules 103a, 103b . . . 103n (also referred to individually and collectively herein as camera module 103). While three camera modules 103a, 103b, 103n are illustrated in FIG. 1, the camera array 101 may include any number of camera modules 103. The camera array 101 may be constructed using individual cameras with each camera module 103 including one individual camera. In some embodiments, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, the camera modules 103a, 103b . . . 103n in the camera array 101 may be configured in different geometries (e.g., a sphere, a line, a cylinder, a cone, a cube, etc.) with the corresponding lenses 113 facing in different directions. For example, the camera modules 103 are positioned within the camera array 101 in a honeycomb pattern where each of the compartments form an aperture where a camera module 103 may be inserted. In another example, the camera array 101 includes multiple lenses along a horizontal axis and a smaller number of lenses on a vertical axis.

In some embodiments, the camera modules 103a, 103b . . . 103n in the camera array 101 are oriented around a sphere in different directions with sufficient diameter and field-of-view to capture enough view disparity to render stereoscopic images. For example, the camera array 101 may comprise HERO3+GoPro® cameras that are distributed around a sphere. In another example, the camera array 101 may comprise 32 Point Grey Blackfly Gigabit Ethernet cameras distributed around a 20 centimeter diameter sphere. Camera models that are different from the HERO3+ or the Point Grey Blackfly camera model may be included in the camera array 101. For example, in some embodiments the camera array 101 comprises a sphere whose exterior surface is covered in one or more optical sensors configured to render 3D images or video. The optical sensors may be communicatively coupled to a controller. The entire exterior surface of the sphere may be covered in optical sensors configured to render 3D images or video.

In some embodiments, the camera modules 103 in the camera array 101 are configured to have a sufficient field-of-view overlap so that all objects can be seen from more than one view point. For example, the horizontal field of view for each camera module 103 included in the camera array 101 is 70 degrees. In some embodiments, having the camera array 101 configured in such a way that an object may be viewed by more than one camera module 103 is beneficial for correcting exposure or color deficiencies in the images captured by the camera array 101.

The camera modules 103 in the camera array 101 may or may not include built-in batteries. The camera modules 103 may obtain power from a battery coupled to the connection hub 123. In some embodiments, the external cases of the camera modules 103 may be made of heat-transferring materials such as metal so that the heat in the camera modules 103 may be dissipated more quickly than using other materials. In some embodiments, each camera module 103 may include a heat dissipation element. Examples of heat dissipation elements include, but are not limited to, heat sinks, fans, and heat-dissipating putty.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

In some embodiments, the camera modules 103a, 103b . . . 103n in the camera array 101 may form a daisy chain in which the camera modules 103a, 103b . . . 103n are connected in sequence. The camera modules 103a, 103b . . . 103n in the camera array 101 may be synchronized through the daisy chain. One camera module (e.g., the camera module 103a) in the daisy chain may be configured as a master camera module that controls clock signals for other camera modules in the camera array 101. The clock signals may be used to synchronize operations (e.g., start operations, stop operations) of the camera modules 103 in the camera array 101. Through the synchronized start and stop operations of the camera modules 103, the image frames in the respective video data captured by the respective camera modules 103a, 103b . . . 103n are also synchronized.

Example embodiments of the camera array 101 and the camera modules 103 are described in U.S. application Ser. No. 14/444,938, titled "Camera Array Including Camera Modules," filed Jul. 28, 2014, which is herein incorporated in its entirety by reference.

The camera modules 103 may be coupled to the connection hub 123. For example, the camera module 103a is communicatively coupled to the connection hub 123 via a signal line 102a, the camera module 103b is communicatively coupled to the connection hub 123 via a signal line 102b, and the camera module 103n is communicatively coupled to the connection hub 123 via a signal line 102n. In some embodiments, a signal line in the disclosure may represent a wired connection or any combination of wired connections such as connections using Ethernet cables, high-definition multimedia interface (HDMI) cables, universal serial bus (USB) cables, RCA cables, Firewire, CameraLink, or any other signal line suitable for transmitting video data and audio data. Alternatively, a signal line in the disclosure may represent a wireless connection such as a wireless fidelity (Wi-Fi) connection or a BLUETOOTH® connection.

The microphone array 107 may include one or more microphones configured to capture sounds from different directions in an environment. In some embodiments, the microphone array 107 may include one or more processors and one or more memories. The microphone array 107 may include a heat dissipation element. In the illustrated embodiment, the microphone array 107 is coupled to the connection hub 123 via a signal line 104. Alternatively or additionally, the microphone array 107 may be directly coupled to other entities of the system 100 such as the client device 127.

The microphone array 107 may capture sound from various directions. The sound may be stored as raw audio data on a non-transitory memory communicatively coupled to the microphone array 107. The microphone array 107 may detect directionality of the sound. The directionality of the sound may be encoded and stored as part of the raw audio data.

In some embodiments, the microphone array 107 may include a Core Sound Tetramic soundfield tetrahedral microphone array following the principles of ambisonics, enabling reconstruction of sound from any arbitrary direction. In another example, the microphone array includes the Eigenmike, which advantageously includes a greater number of microphones and, as a result, can perform higher-order (i.e. more spatially accurate) ambisonics. The microphone may be mounted to the top of the camera array 101, be positioned between camera modules 103, or be positioned within the body of the camera array 101.

In some embodiments, the camera modules 103 may be mounted around a camera housing (e.g., a spherical housing, honeycomb housing, or a housing with another suitable shape). The microphone array 107 may include multiple microphones mounted around the same camera housing, with each microphone located in a different position. The camera housing may act as a proxy for the head-shadow sound-blocking properties of a human head. As described below with reference to FIG. 2, during playback of the recorded audio data, an audio module 212 may select an audio track for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the client device 127 for processing and storage. The connection hub 123 may also receive and aggregate streams of raw video data describing image frames captured by the respective camera modules 103. The connection hub 123 may then transfer the raw video data to the client device 127 for processing and storage. The connection hub 123 is communicatively coupled to the client device 127 via a signal line 106. In some examples, the connection hub 123 may be a USB hub. In some embodiments, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television, or any other processor based computing device. In some embodiments, the client device 127 includes network functionality and is communicatively coupled to the network 105 via a signal line 108. The client device 127 may be configured to transmit data to the server 129 or to receive data from the server 129 via the network 105.

The client device 127 may receive raw video data and raw audio data from the connection hub 123. In some embodiments, the client device 127 may store the raw video data and raw audio data locally in a storage device associated with the client device 127. Alternatively, the client device 127 may send the raw video data and raw audio data to the server 129 via the network 105 and may store the raw video data and the audio data on a storage device associated with the server 129. In some embodiments, the client device 127 includes a content system 131 for aggregating raw video data captured by the camera modules 103 to form 3D video data and aggregating raw audio data captured by the microphone array 107 to form 3D audio data. Alternatively or additionally, the content system 131 may be operable on the server 129.

The content system 131 may include a system configured to aggregate raw video data and raw audio data to generate a stream of 3D video data and a stream of 3D audio data, respectively. The content system 131 may be stored on a single device or a combination of devices of FIG. 1. In some embodiments, the content system 131 can be implemented using hardware including a field-programmable gate array ("FPGA") or an application-specific integrated circuit ("ASIC"). In some other embodiments, the content system 131 may be implemented using a combination of hardware and software. The content system 131 is described below in more detail with reference to FIGS. 2-5.

The viewing system 133 may include or use a computing device to decode and render a stream of 3D video data on a virtual reality display device (e.g., Oculus Rift virtual reality display) or other suitable display devices that include, but are not limited to: augmented reality glasses; televisions, smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include the virtual reality display configured to render the 3D video data and the audio reproduction device configured to render the 3D audio data. The viewing system 133 may be coupled to the client device 127 via a signal line 110 and the network 105 via a signal line 112. A user 134 may interact with the viewing system 133.

In some embodiments, the viewing system 133 may receive virtual reality content from the client device 127. Alternatively or additionally, the viewing system 133 may receive the virtual reality content from the server 129. The viewing system 133 may also be coupled to the content system 131 and may receive the virtual reality content from the content system 131. The virtual reality content may include one or more of a stream of 3D video data, a stream of 3D audio data, a compressed stream of 3D video data, a compressed stream of 3D audio data, and other suitable content.

The viewing system 133 may track a head orientation of a user. For example, the viewing system 133 may include one or more accelerometers or gyroscopes used to detect a change in the user's head orientation. The viewing system 133 may decode and render the stream of 3D video data on a virtual reality display device and the stream of 3D audio data on a speaker system based on the head orientation of the user. As the user changes his or her head orientation, the viewing system 133 may adjust the rendering of the 3D video data and 3D audio data based on the changes of the user's head orientation.

The viewing system 133 may provide an immersive viewing experience to the user 134. For example, the viewing system 133 may include a virtual reality display device that has a wide field of view so that the user 134 viewing the virtual reality content feels like he or she is surrounded by the virtual reality content in a manner similar to in a real-life environment. A complete 360-degree view of the scene is provided to the user 134, and the user 134 may view the scene in any direction. As the user 134 moves his or her head, the view is modified to match what the user 134 would see as if he or she was moving his or her head in the real world. By providing a different view to each eye (e.g., a stream of left panoramic images for left eye viewing and a stream of right panoramic images for right eye viewing), which simulates what the left and right eyes may see in the real world, the viewing system 133 may give the user 134 a 3D view of the scene. Additionally, 3D surrounding sound may be provided to the user 134 based on the user's head orientation to augment the immersive 3D viewing experience. For example, if a character in an immersive movie is currently behind the user 134, the character's voice may appear to be emanating from behind the user 134.

In some embodiments, the viewing system 133 may allow the user 134 to adjust the left panoramic images and the right panoramic images to conform to the user's interpupillary distance. The left panoramic images and the right panoramic images may move further apart for users with larger interpupillary distances or may move closer for users with smaller interpupillary distances.

In some embodiments, the viewing system 133 includes a peripheral device such as a microphone, camera, mouse, or keyboard that is configured to enable the user 134 to provide an input to one or more components of the system 100. For example, the user 134 may interact with the peripheral device to provide a status update to the social network service provided by the social network server 135. In some embodiments, the peripheral device includes a motion sensor such as the Microsoft® Kinect or another similar device, which allows the user 134 to provide gesture inputs to the viewing system 133 or other entities of the system 100.

In some embodiments, the viewing system 133 includes peripheral devices for making physical contact with the user to make the virtual reality experience more realistic. The viewing system 133 may include gloves for providing the user 134 with tactile sensations that correspond to virtual reality content. For example, the virtual reality content may include images of another user and when the user 134 reaches out to touch the other user the viewing system 133 provides pressure and vibrations that make it feel like the user 134 is making physical contact with the other user. In some embodiments, the viewing system 133 may include peripheral devices for other parts of the body.

In some embodiments, multiple viewing systems 133 may receive and consume the virtual reality content streamed by the content system 131. In other words, two or more viewing systems 133 may be communicatively coupled to the content system 131 and configured to simultaneously or contemporaneously receive and consume the virtual reality content generated by the content system 131.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include BLUETOOTH® communication networks or a cellular communication network for sending and receiving data including via short messaging service (SMS), multimedia messaging service (MMS), hypertext transfer protocol (HTTP), direct data connection, WAP, e-mail, etc.

The server 129 may be a hardware server that includes a processor, a memory, and network communication capabilities. In the illustrated embodiment, the server 129 is coupled to the network 105 via a signal line 120. The server 129 sends and receives data to and from one or more of the other entities of the system 100 via the network 105. For example, the server 129 receives VR content including a stream of 3D video data (or compressed 3D video data) and a stream of 3D audio data (or compressed 3D audio data) from the client device 127 and stores the VR content on a storage device associated with the server 129. Alternatively, the server 129 includes the content system 131 that receives raw video data and raw audio data from the client device 127 and aggregates the raw video data and raw audio data to generate the VR content. The viewing system 133 may access the VR content from the server 129 or the client device 127.

The ad server 141 may be a hardware server that includes a processor, a memory, and network communication capabilities. In the illustrated embodiment, the ad server 141 is coupled to the network 105 via a signal line 114. The ad server 141 sends and receives data to and from one or more of the other entities of the system 100 via the network 105. In some embodiments, the ad server 141 is an advertisement repository for advertisements that are requested by the content system 131 for display as part of the virtual reality content.

In some embodiments, the ad server 141 includes rules for targeting advertisements to specific users, for targeting advertisements to be displayed in conjunction with various types of content (e.g., content served by the content server 139, virtual reality content served by the client device 127 or the server 129), for targeting advertisements to specific locations or Internet Protocol (IP) addresses associated with the client device 127, the viewing system 133, or the user 134. The ad server 141 may include other rules for selecting and/or targeting advertisements.

In some embodiments, the ad server 141 receives metadata associated with virtual reality content displayed by the viewing system 133 and selects advertisements for presentation in conjunction with the virtual reality content based on the metadata. For example, the ad server 141 selects stored advertisements based on keywords associated with the virtual reality content. Other methods are possible for providing targeted advertisements to users, which may alternatively or additionally be implemented in the embodiments described herein.

The content server 139 may be a hardware server that includes a processor, a memory, and network communication capabilities. In the illustrated embodiment, the content server 139 is coupled to the network 105 via a signal line 116. The content server 139 sends and receives data to and from one or more of the other entities of the system 100 via the network 105. The content provided by the content server 139 may include any content that is configured to be rendered as 3D video data and/or 3D audio data. In some embodiments, the content provided by the content server 139 may be videos of events such as sporting events, weddings, press conferences or other events, movies, television shows, music videos, interactive maps such as Google® StreetView maps, and any other virtual reality content. In some embodiments, the content includes a video game. In other embodiments, the content includes a picture such as a family photo that has been configured to be experienced as virtual reality content.

In some embodiments, the content server 139 provides content responsive to a request from the content system 131, the client device 127, or the viewing system 133. For example, the content server 139 is searchable using keywords. The client device 127, the viewing system 133, or the content system 131 provides a keyword search to the content server 139 and selects content to be viewed on the viewing system 133. In some embodiments, the content server 139 enables a user to browse content associated with the content server 139. For example, the content includes a virtual store including items for purchase and the user may navigate the store in 3D. In some embodiments, the content server 139 may provide the user with content recommendations. For example, the content server 139 recommends items for purchase inside the 3D store.

The second server 198 may be a hardware server that includes a processor, a memory, and network communication capabilities. In the illustrated embodiment, the second server 198 is coupled to the network 105 via a signal line 197. The second server 198 sends and receives data to and from one or more of the other entities of the system 100 via the network 105. The second server 198 may provide computer-generated imagery to the content system 131 for insertion into the stream so that live and computer-generated images may be combined. In other embodiments, the second server 198 provides audio tracks that may be provided to the content system 131 for insertion into the stream so that live content includes an audio track. For example, the audio track is a soundtrack.

In some embodiments, the second server 198 includes functionality to modify the video or audio provided to the content system 131. For example, the second server 198 includes code and routines executed by a processor and configured to provide noise cancellation of audio, reverberation effects for audio, insertion of video effects, etc. Accordingly, the second server 198 may be configured to enhance or transform video and audio associated with the content system 131.

The social network server 135 may be a hardware server that includes a processor, a memory, and network communication capabilities. In the illustrated embodiment, the social network server 135 is coupled to the network 105 via a signal line 118. The social network server 135 sends and receives data to and from one or more of the other entities of the system 100 via the network 105. The social network server 135 includes a social network application 137. A social network may be a type of social structure where the users may be connected by a common feature. The common feature includes relationships/connections, e.g., friendship, family, work, an interest, etc. Common features do not have to be explicit. For example, the common feature may include users who are watching the same live event (e.g., football game, concert, etc.), playing the same video game, etc. In some embodiments, the users are watching the event using the functionality provided by the content system 131 and the viewing systems 133. The common features may be provided by one or more social networking systems including explicitly defined relationships and relationships implied by social connections with other online users, where the relationships form a social graph. In some examples, the social graph may reflect a mapping of these users and how they may be related.

Although only one social network server 135 with one social network application 137 is illustrated, there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus. In another embodiment, the social network application 137 may be part of the content system 131.

In some embodiments, the social network includes a service that provides a social feed describing one or more social activities of a user. For example, the social feed includes one or more status updates for the user describing the user's actions, expressed thoughts, expressed opinions, etc. In some embodiments, the service provided by the social network application 137 is referred to as a "social network service." Other embodiments may be possible.

In some embodiments, the social network server 135 communicates with one or more of the camera array 101, the microphone array 107, the content system 131, the server 129, the viewing system 133, and the client device 127 to incorporate data from a social graph of a user in a virtual reality experience for the user.

In some embodiments, the system 100 includes two or more camera arrays 101 and two or more microphone arrays 107, and a user may switch between two or more viewpoints of the two or more camera arrays 101. For example, the system 100 may be used to record a live event such as a baseball game. The user may use the viewing system 133 to watch the baseball game from a first view point associated with a first camera array 101. A play is developing on the field and the user may want to switch viewpoints to have a better vantage of the play. The user provides an input to the content system 131 via the viewing system 133, and the content system 131 may switch to a second camera array 101 which provides a better vantage of the play. The second camera array 101 may be associated with a different microphone array 107 which provides different sound to the user specific to the user's new vantage point.

Figure 2:
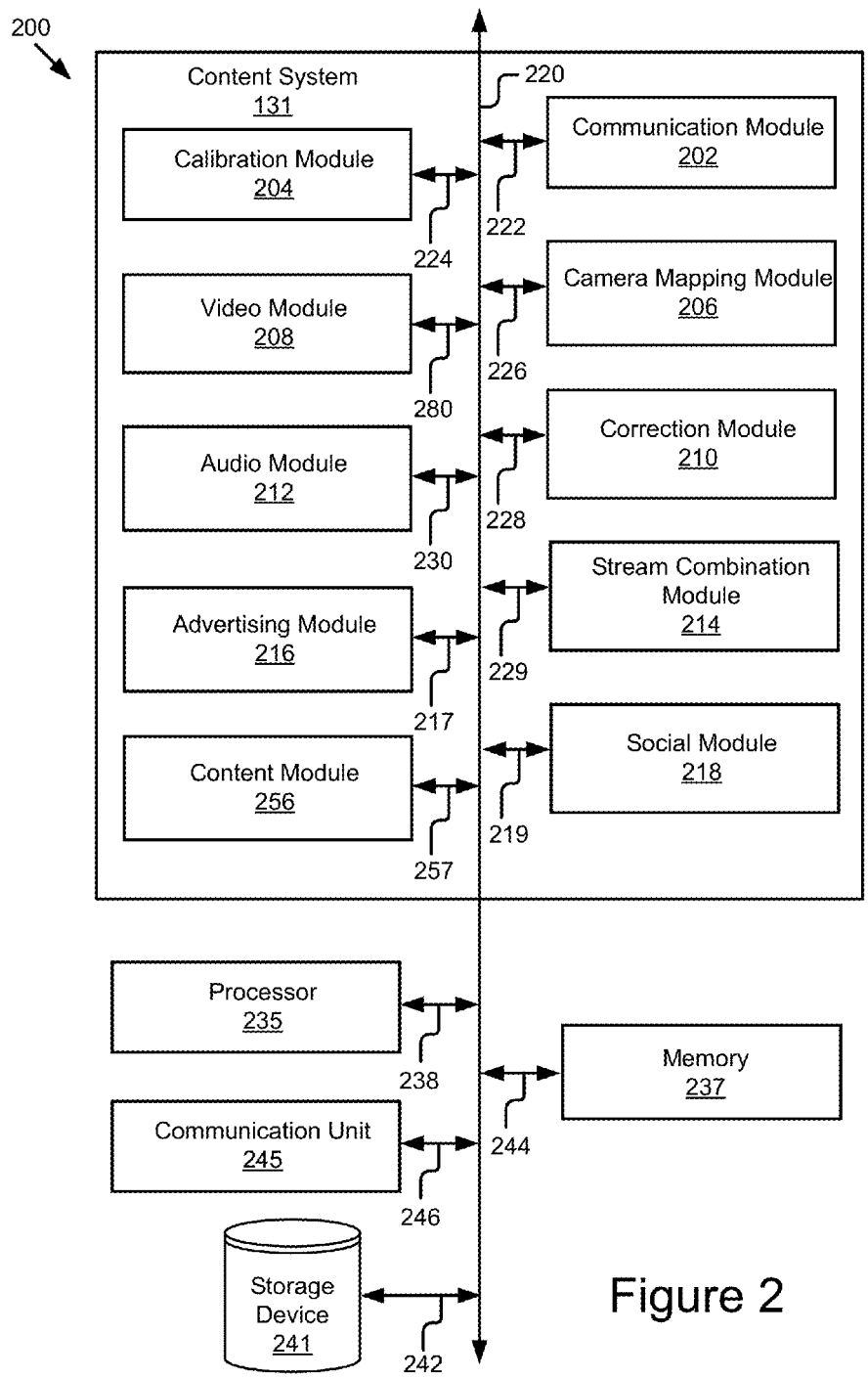
FIG. 2 illustrates a block diagram of some embodiments of a computing device that includes an example content system.

Referring now to FIG. 2, an example of the content system 131 is illustrated in accordance with at least some embodiments described herein. FIG. 2 is a block diagram of a computing device 200 that includes the content system 131, a memory 237, a processor 235, a storage device 241, and a communication unit 245. In the illustrated embodiment, the components of the computing device 200 are communicatively coupled by a bus 220. In some embodiments, the computing device 200 may be a personal computer, smartphone, tablet computer, set top box, or any other processor-based computing device. The computing device 200 may be one of the client device 127, the server 129, and another device in the system 100 of FIG. 1.

The processor 235 may include an arithmetic logic unit, a microprocessor, a controller, or some other processor array to perform computations and provide electronic display signals to a display device. The processor 235 is coupled to the bus 220 for communication with the other components via a signal line 238. The processor 235 may process data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors may be included. Other processors, operating systems, sensors, displays, and physical configurations may be possible.

The memory 237 includes a non-transitory memory that stores data for providing the functionality described herein. The memory 237 may be a dynamic random access memory (DRAM) device, a static random access memory (SRAM) device, flash memory, or some other memory devices. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 237 may store the code, routines, and data for the content system 131 to provide its functionality. The memory 237 is coupled to the bus 220 via a signal line 244.

The communication unit 245 may transmit data to any of the entities of the system 100 depicted in FIG. 1. Similarly, the communication unit 245 may receive data from any of the entities of the system 100 depicted in FIG. 1. The communication unit 245 may include one or more Ethernet switches for receiving the raw video data and the raw audio data from the connection hub 123. The communication unit 245 is coupled to the bus 220 via a signal line 246. In some embodiments, the communication unit 245 includes a port for direct physical connection to a network, such as the network 105 of FIG. 1, or to another communication channel. For example, the communication unit 245 may include a port such as a USB, SD, RJ45, or similar port for wired communication with another computing device. In some embodiments, the communication unit 245 includes a wireless transceiver for exchanging data with another computing device or other communication channels using one or more wireless communication methods, including IEEE 820.11, IEEE 820.16, BLUETOOTH®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to a network for distribution of data using standard network protocols including TCP/IP, HTTP, HTTPS, and SMTP, etc.

The storage device 241 may be a non-transitory storage medium that stores data for providing the functionality described herein. The storage device 241 may be a dynamic random access memory (DRAM) device, a static random access memory (SRAM) device, flash memory, or some other memory devices. In some embodiments, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242.

In the embodiment illustrated in FIG. 2, the content system 131 includes a communication module 202, a calibration module 204, a camera mapping module 206, a video module 208, a correction module 210, the audio module 212, a stream combination module 214, an advertising module 216, a social module 218, and a content module 256. These modules of the content system 131 are communicatively coupled to each other via the bus 220.

In some embodiments, each module of the content system 131 (e.g., modules 202, 204, 206, 208, 210, 212, 214, 216, 218, or 256) may include a respective set of instructions executable by the processor 235 to provide its respective functionality described below. In some embodiments, each module of the content system 131 may be stored in the memory 237 of the computing device 200 and may be accessible and executable by the processor 235. Each module of the content system 131 may be adapted for cooperation and communication with the processor 235 and other components of the computing device 200.

The communication module 202 may be software including routines for handling communications between the content system 131 and other components of the computing device 200. The communication module 202 may be communicatively coupled to the bus 220 via a signal line 222. The communication module 202 sends and receives data, via the communication unit 245, to and from one or more of the entities of the system 100 depicted in FIG. 1. For example, the communication module 202 may receive raw video data from the connection hub 123 via the communication unit 245 and may forward the raw video data to the video module 208. In another example, the communication module 202 may receive virtual reality content from the stream combination module 214 and may send the virtual reality content to the viewing system 133 via the communication unit 245.

In some embodiments, the communication module 202 receives data from components of the content system 131 and stores the data in the memory 237 or the storage device 241. For example, the communication module 202 receives virtual reality content from the stream combination module 214 and stores the virtual reality content in the memory 237 or the storage device 241. In some embodiments, the communication module 202 retrieves data from the memory 237 or the storage device 241 and sends the data to one or more appropriate components of the content system 131. Alternatively or additionally, the communication module 202 may also handle communications between components of the content system 131.

The calibration module 204 may be software including routines for calibrating the camera modules 103 in the camera array 101. The calibration module 204 may be adapted for cooperation and communication with the processor 235 and other components of the computing device 200 via a signal line 224.

In some embodiments, lenses included in the camera modules 103 may have some amount of spherical distortion. Images captured with the camera modules 103 may have a barrel distortion or a pin-cushion distortion that needs to be corrected during creation of panoramic images from the distorted images. The barrel distortion may be referred to as a "fish eye effect." For each camera module 103, the calibration module 204 calibrates a lens in the corresponding camera module 103 to determine associated distortion caused by the lens. For example, a snapshot of a test pattern that has known geometries placed in a known location (e.g., a checkerboard in a known location) may be captured by the camera module 103. The calibration module 204 may determine properties of a lens included in the camera module 103 from the snapshot of the test pattern. Properties of a lens may include, but are not limited to, distortion parameters, an optical center, and other optical properties associated with the lens.

The calibration module 204 stores data describing the properties of each lens in a configuration file. The configuration file may include data describing properties of all lenses of all the camera modules 103 in the camera array 101. For example, the configuration file includes data describing distortion parameters, an optical center, and other optical properties for each lens in the camera array 101.

Alternatively or additionally, the calibration module 204 may perform multi-camera geometric calibration on the camera array 101 to determine variations in the physical properties of the camera array 101. For example, the calibration module 204 may determine slight variations in camera orientation for each lens in the camera array 101, where the slight variations in the camera orientation may be caused by human errors occurring during an installation or manufacture process of the camera array 101. In another example, the calibration module 204 may estimate errors in the predicted roll, pitch, and yaw of a corresponding lens in each camera module 103. The calibration module 204 may determine a position and a rotational offset for the corresponding lens in each camera module 103 and may store the position and the rotational offset for the corresponding lens in the configuration file. As a result, the relative position of each two lenses in the camera array 101 may be determined based on the positions and rotational offsets of the two corresponding lenses. For example, spatial transformation between each two lenses may be determined based on the positions and rotational offsets of the two corresponding lenses.

The camera mapping module 206 may be software including routines for constructing a left camera map and a right camera map. The camera mapping module 206 may be adapted for cooperation and communication with the processor 235 and other components of the computing device 200 via a signal line 226.

A two-dimensional (2D) spherical panoramic image may be used to represent a panorama of an entire scene. As described below with reference to the video module 208, two stereoscopic panorama images may be generated for two eyes to provide a stereoscopic view of the entire scene. For example, a left panoramic image may be generated for the left eye viewing and a right panoramic image may be generated for the right eye viewing.

A pixel in a panoramic image may be presented by a yaw value and a pitch value. Yaw represents rotation around the center and may be represented on the horizontal x-axis as:

$$yaw=360°\times x/width. \quad (1)$$

Yaw has a value between 0° and 360°. Pitch represents up or down rotation and may be represented on the vertical y-axis as:

$$pitch=90°\times(height/2-y)/(height/2). \quad (2)$$

Pitch has a value between −90° and 90°.

The panoramic images may give a sense of real depth by exploiting a human brain's capacity to transform disparity (e.g., shifts in pixel positions) into depth. For example, a nearby object may have a larger disparity than a far-away object. Disparity may represent pixel shifts in positions between two images. Disparity may be caused by an interocular distance which represents a distance between two eyes. Each eye may receive a slightly different image, which creates a sense of depth.

Typical stereoscopic systems (e.g., 3D movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at a position with yaw ∈[0°,360°] and pitch=0° in a left panoramic image may represent an eye viewing position of the left eye as the head is rotated to the position indicated by the yaw value and the pitch value. Similarly, a pixel at the position with yaws [0°,360°] and pitch=0° in a right panoramic image represents an eye viewing position of the right eye as the head is rotated to the position indicated by the yaw value and the pitch value. For pitch=0° (e.g., no up and down rotations), as the head is rotated from yaw=0° to yaw=360°, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). As a user tilts his or her head upwards or downwards (e.g., pitch≠0°), the dominant orientation of the user's eyes with respect to points on the sphere may become less well defined compared to pitch=0°. For example, when the user looks directly upward with pitch=90°, the orientation of the user's eyes with respect to the north pole point of the sphere may be completely ambiguous since the user's eyes may view the north pole point of the sphere from any yaw. Stereo vision may not be supported in the upward and downward directions using left/right eye spheres that are supported in the horizontal orientation. As a result, binocularity may be phased out by diminishing the interocular distance with an adjustment function f(pitch). An output of the adjustment function f(pitch) may decline from 1 to 0 as the pitch increases from 0° to 90° or decreases from 0° to −90°. For example, the adjustment function f(pitch) may include cos(pitch). The interocular distance may be adjusted based on the adjustment function f(pitch). For example, the interocular distance associated with the pitch may be adjusted as:

$$\text{interocular distance}=\max(\text{interocular distance})\times f(\text{pitch}), \quad (3)$$

where max(interocular distance) represents the maximum value of the interocular distance (e.g., the interocular distance is at its maximum when pitch=0°). If f(pitch)=cos(pitch), then the interocular distance may be expressed as:

$$\text{interocular distance}=\max(\text{interocular distance})\times\cos(\text{pitch}). \quad (4)$$

In some examples, the maximum value of the interocular distance may be about 60 millimeters. In other examples, the maximum value of the interocular distance may have a value greater than 60 millimeters or less than 60 millimeters.

The camera mapping module 206 may construct a left camera map that identifies a corresponding matching camera module 103 for each pixel in a left panoramic image. For example, for a pixel in a left panoramic image that represents a point in a panorama, the left camera map may identify a matching camera module 103 that has a best view for the point in the panorama compared to other camera modules 103. Thus, the left camera map may map pixels in a left panoramic image to matching camera modules 103 that have best views for the corresponding pixels. Determination of a matching camera module 103 for a pixel is described below in more detail.

A camera map may include a left camera map or a right camera map. A camera map may use (yaw, pitch) as an input and may generate an output of (an identifier of a matching camera module, x, y), indicating a pixel (yaw, pitch) in a panoramic image may be obtained as a pixel (x, y) in an image plane of the identified matching camera module. The camera map may store the output (an identifier of a matching camera module, x, y) in a map entry related to the input (yaw, pitch). Pixels in an image plane of a camera module may be determined by using a camera model (e.g., a pinhole camera model or more complex lens model) to map points in 3D space onto pixels in the image plane of the camera module, where the points in the 3D space are assumed to be at a particular distance from the camera module. The distance may be set at a fixed radius or varied as a function of pitch and yaw. The distance may be determined by: (1) measuring the scene; (2) manual adjustment by a human operator; (3) using a depth sensor to measure depths of the points in the 3D space; or (4) determining the depths using stereo disparity algorithms.

For each pixel in a left panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the left eye (e.g., a left viewing direction) to the corresponding point in the panorama.

In some embodiments, a matching camera module 103 for a pixel in a left panoramic image that has a better view of the pixel may have a viewing direction to a point in a panorama that corresponds to the pixel in the left panoramic image. The viewing direction of the matching camera module 103 is closer to the left viewing direction than other viewing directions of other camera modules 103 to the same point in the panorama. For example, the viewing direction of the matching camera module 103 is more parallel to the left viewing direction than other viewing directions of other camera modules 103. In other words, for each pixel in the left panoramic image, the left camera map may identify a corresponding matching camera module 103 that has a viewing direction most parallel to the left viewing direction than other viewing directions of other camera modules 103.

Similarly, the camera mapping module 206 may construct a right camera map that identifies a corresponding matching camera module 103 for each pixel in a right panoramic image. For example, for a pixel in a right panoramic image that represents a point in a panorama, the right camera map may identify a matching camera module 103 that has a better view for the point in the panorama than other camera modules 103. Thus, the right camera map may map pixels in a right panoramic image to matching camera modules 103 that have better views for the corresponding pixels.

For each pixel in a right panoramic image that represents a point in a panorama, the camera mapping module 206 may determine a yaw, a pitch, and an interocular distance using the above mathematical expressions (1), (2), and (3), respectively. The camera mapping module 206 may use the yaw and pitch to construct a vector representing a viewing direction of the right eye (e.g., a right viewing direction) to the corresponding point in the panorama.

In some embodiments, a matching camera module 103 for a pixel in a right panoramic image that has a better view of the pixel may have a viewing direction to a point in a panorama that corresponds to the pixel in the right panoramic image. The viewing direction of the matching camera module 103 is closer to the right viewing direction than other viewing directions of other camera modules 103 to the same point in the panorama. For example, the viewing direction of the matching camera module 103 is more parallel to the right viewing direction than other viewing directions of other camera modules 103. In other words, for each pixel in the right panoramic image, the right camera map may identify a corresponding matching camera module 103 that has a viewing direction most parallel to the right viewing direction than other viewing directions of other camera modules 103.

Since the physical configuration of the camera array 101 is fixed, the left and right camera maps are the same for different left panoramic images and right panoramic images, respectively. The left and right camera maps may be pre-computed and stored to achieve a faster processing speed compared to an on-the-fly computation.

The video module 208 may be software including routines for generating a stream of 3D video data configured to render 3D video when played back on a virtual reality display device. The video module 208 may be adapted for cooperation and communication with the processor 235 and other components of the computing device 200 via a signal line 280. The stream of 3D video data may describe a stereoscopic panorama of a scene that may vary over time. The stream of 3D video data may include a stream of left panoramic images for left eye viewing and a stream of right panoramic images for right eye viewing.

In some embodiments, the video module 208 receives raw video data describing image frames from the various camera modules 103 in the camera array 101. The video module 208 identifies a location and timing associated with each of the camera modules 103 and synchronizes the image frames based on locations and timings of the camera modules 103. The video module 208 synchronizes image frames captured by different camera modules 103 at the same times.

For example, the video module 208 receives a first stream of image frames from a first camera module 103 and a second stream of image frames from a second camera module 103. The video module 208 identifies that the first camera module 103 is located at a position with yaw=0° and pitch=0° and the second camera module 103 is located at a position with yaw=30° and pitch=0°. The video module 208 synchronizes the first stream of image frames with the second stream of image frames by associating a first image frame from the first stream at a time $T=T_0$ with a second image frame from the second stream at the time $T=T_0$, a third image frame from the first stream at a time $T=T_1$ with a fourth image frame from the second stream at the time $T=T_1$, and so on and so forth.

In some implementations, the video module 208 sends the synchronized image frames to the correction module 210 so that the correction module 210 may correct calibration errors in the synchronized image frames. For example, the correction module 210 may correct lens distortion, orientation errors, and rotation errors, etc., in the image frames. The correction module 210 may send the image frames back to the video module 208 after correcting the calibration errors.

The video module 208 may receive a left camera map and a right camera map from the camera mapping module 206. Alternatively, the video module 208 may retrieve the left and right camera maps from the storage device 241 or the memory 237. The video module 208 may construct a stream of left panoramic images from the image frames based on the left camera map. For example, the video module 208 identifies matching camera modules 103 listed in the left camera map. The video module 208 constructs a first left panoramic image $PI_{L,0}$ for a first time $T=T_0$ by stitching together image frames captured at the first time $T=T_0$ by the matching camera modules 103. The video module 208 constructs a second left panoramic image $PI_{L,1}$ at a second time $T=T_1$ using image frames captured at the second time $T=T_1$ by the matching camera modules 103, and so on and so forth. The video module 208 constructs the stream of left panoramic images to include the first left panoramic image $PI_{L,0}$ at the first time T=$T_0$, the second left panoramic image $PI_{L,1}$ at the second time T=$T_1$, and other left panoramic images at other corresponding times.

Specifically, for a pixel in a left panoramic image $PI_{L,i}$ at a particular time T=$T_i$ (i=0, 1, 2, . . . ), the video module 208: (1) identifies a matching camera module 103 from the left camera map; and (2) configures the pixel in the left panoramic image $PI_{L,i}$ to be a corresponding pixel from an image frame captured by the matching camera module 103 at the same time T=$T_i$. The pixel in the left panoramic image $PI_{L,i}$ and the corresponding pixel in the image frame of the matching camera module 103 may correspond to the same point in the panorama. For example, for a pixel location in the left panoramic image $PI_{L,i}$ that corresponds to a point in the panorama, the video module 208: (1) retrieves a pixel that also corresponds to the same point in the panorama from the image frame captured by the matching camera module 103 at the same time T=$T_i$; and (2) places the pixel from the image frame of the matching camera module 103 into the pixel location of the left panoramic image $PI_{L,i}$.

Similarly, the video module 208 constructs a stream of right panoramic images from the image frames based on the right camera map by performing operations similar to those described above with reference to the construction of the stream of left panoramic images. For example, the video module 208 identifies matching camera modules 103 listed in the right camera map. The video module 208 constructs a first right panoramic image $PI_{R,0}$ for a first time T=$T_0$ by stitching together image frames captured at the first time T=$T_0$ by the matching camera modules 103. The video module 208 constructs a second right panoramic image $PI_{R,1}$ at a second time T=$T_1$ using image frames captured at the second time T=$T_1$ by the matching camera modules 103, and so on and so forth. The video module 208 constructs the stream of right panoramic images to include the first right panoramic image $PI_{R,0}$ at the first time T=$T_0$, the second right panoramic image $PI_{R,1}$ at the second time T=$T_1$, and other right panoramic images at other corresponding times.

Specifically, for a pixel in a right panoramic image $PI_{R,i}$ at a particular time T=$T_i$ (i=0, 1, 2, . . . ), the video module 208: (1) identifies a matching camera module 103 from the right camera map; and (2) configures the pixel in the right panoramic image $PI_{R,i}$ to be a corresponding pixel from an image frame captured by the matching camera module 103 at the same time T=$T_i$. The pixel in the right panoramic image $PI_{R,i}$ and the corresponding pixel in the image frame of the matching camera module 103 may correspond to the same point in the panorama.

In some embodiments, the video module 208 may construct pixels in a left or right panoramic image by blending pixels from image frames of multiple camera modules 103 according to weights associated with the multiple camera modules 103. An example pixel blending process is described below in more detail with reference to FIG. 8.

In some embodiments, the left and right panoramic images may be optimized for stereoscopic viewing in a horizontal plane (e.g., yaws [0°, 360°] and pitch=0°). Alternatively or additionally, the left and right panoramic images may be optimized based on a user's viewing direction. For example, the video module 208 may adaptively construct the streams of left panoramic images and right panoramic images based on the user's current viewing direction. A panorama provided by the streams of left and right panoramic images may have a high-resolution in the user's current viewing direction and a low-resolution in a reverse viewing direction. This panorama may be referred to as a directional panorama. As the user rotates his or her head to view the panorama in a new viewing direction, the directional panorama may be adjusted to have a high resolution in the new viewing direction and a low resolution in a viewing direction opposite to the new viewing direction. Since only a directional panorama is constructed, bandwidth and other resources may be saved compared to constructing a full high-resolution panorama. However, quality of the 3D viewing experience is not affected if the user does not change viewing directions rapidly.

In some embodiments, a constructed left or right panoramic image may have color deficiencies. For example, since the lenses in the camera modules 103 may point to different directions, light and color conditions may vary for the different lenses. Some image frames taken by some camera modules 103 may be over-exposed while some other image frames taken by other camera modules 103 may be under-exposed. The exposure or color deficiencies between image frames from different camera modules 103 may be corrected by the correction module 210 during a construction process of the left or right panoramic image.

Additionally or alternatively, due to the disparity between neighboring camera modules 103, a constructed left or right panoramic image may have stitching artifacts (or, stitching errors) where the viewpoint switches from a camera module 103 to a neighboring camera module 103. Objects that are far away from the camera modules 103 may have negligible disparity and there may be no stitching errors for the far-away objects. However, objects that are near the camera modules 103 may have noticeable disparity and there may be stitching errors for the nearby objects. Correction of the stitching errors is described below in more detail with reference to the correction module 210.

The correction module 210 may be software including routines for correcting aberrations in image frames or panoramic images. The correction module 210 is communicatively coupled to the bus 220 via a signal line 228. The aberrations may include calibration errors, exposure or color deficiencies, stitching artifacts, and other types of aberrations. The stitching artifacts may include errors made by the video module 208 when stitching image frames from various camera modules 103 to form a left or right panoramic image. The correction module 210 may analyze the image frames or the panoramic images to identify the aberrations. The correction module 210 may process the image frames or panoramic images to mask or correct the aberrations. The correction module 210 may automatically correct the aberrations or provide an administrator of the content system 131 with tools or resources to manually correct the aberrations.

In some embodiments, the correction module 210 receives image frames captured by a camera module 103 and corrects calibration errors on the image frames. For example, the correction module 210 may correct lens distortion (e.g., barrel or pin-cushion distortion) and camera orientation errors in the image frames based on lens distortion parameters, a position, and a rotational offset associated with the camera module 103.

In another example, the correction module 210 may analyze the image frames captured by the camera module 103, determine the calibration errors present in the image frames, and determine calibration factors used to calibrate the camera module 103. The calibration factors may include data used to automatically modify the image frames captured by the camera module 103 so that the image frames include fewer errors. In some embodiments, the calibration factors are applied to the image frames by the correction module 210 so that the image frames include no errors that are detectable during user consumption of the VR content. For example, the correction module 210 may detect the deficiencies in the image frames caused by the calibration errors. The correction module 210 may determine one or more pixels associated with the deficiencies. The correction module 210 may determine the pixel values associated with these pixels and then modify the pixel values using the calibration factors so that the deficiencies are corrected. In some embodiments, the calibration factors may also be provided to an administrator of the camera array 101 who uses the calibration factors to manually correct the calibration deficiencies of the camera array 101.

In some embodiments, the correction module 210 may detect and correct exposure or color deficiencies in the image frames captured by the camera array 101. For example, the correction module 210 may determine one or more pixels associated with the exposure or color deficiencies. The correction module 210 may determine the pixel values associated with these pixels and then modify the pixel values so that the exposure or color deficiencies are not detectable by the user 134 during consumption of the virtual reality content using the viewing system 133. In some embodiments, the camera modules 103 of the camera array 101 have overlapping fields of view, and exposure or color deficiencies in the image frames captured by the camera array 101 may be corrected or auto-corrected using this overlap. In other embodiments, exposure or color deficiencies in the image frames captured by the camera array 101 may be corrected using calibration based on color charts of known values.

In some embodiments, the correction module 210 may correct stitching errors caused by close-by objects. For example, the closer an object is to the camera array 101, the greater the difference of a viewing angle from each camera module 103 to the object. Close-by objects that cross a stitching boundary may abruptly transition between viewing angles and may thus produce an obvious visual discontinuity. This may be referred to herein as the "close object problem." Stitching artifacts may be incurred for close-by objects. One example mechanism to reduce the stitching errors may include increasing the number of camera modules 103 distributed throughout a spherical housing case of the camera array 101 to approach an ideal of a single, continuous, and spherical image sensor. The mechanism may reduce the viewing angle discrepancy between neighboring cameras and may thus reduce the stitching artifacts. Alternatively, virtual cameras may be interpolated between real cameras to simulate an increasing camera density so that stitching artifacts may be reduced. Image stitching using virtual cameras is described in more detail in U.S. application Ser. No. 14/465,581, titled "Image Stitching" and filed on Aug. 21, 2014, which is incorporated herein in its entirety by reference.

The audio module 212 may be software including routines for generating a stream of 3D audio data configured to render 3D audio when played back on an audio reproduction device. The audio module 212 is communicatively coupled to the bus 220 via a signal line 230. The audio module 212 may generate the 3D audio data based on the raw audio data received from the microphone array 107. In some embodiments, the audio module 212 may process the raw audio data to generate four-channel ambisonic audio tracks corresponding to the 3D video data generated by the video module 208. The four-channel ambisonic audio tracks may provide a compelling 3D 360-degree audio experience to the user 134.

In some embodiments, the four-channel audio tracks may be recorded in an "A" format by the microphone array 107 such as a Tetramic microphone. The audio module 212 may transform the "A" format four-channel audio tracks to a "B" format that includes four signals: W, X, Y, and Z. The W signal may represent a pressure signal that corresponds to an omni-directional microphone, and the X, Y, Z signals may correspond to directional sounds in front-back, left-right, and up-down directions, respectively. In some embodiments, the "B" format signals may be played back in a number of modes including, but not limited to, mono, stereo, binaural, surround sound including four or more speakers, and any other modes. In some examples, an audio reproduction device may include a pair of headphones, and the binaural playback mode may be used for the sound playback in the pair of headphones. The audio module 212 may convolve the "B" format channels with Head Related Transfer Functions (HRTFs) to produce binaural audio with a compelling 3D listening experience for the user 134. In some embodiments, the audio is compatible with Dolby® Atmos™.

In some embodiments, the audio module 212 generates 3D audio data that is configured to provide sound localization to be consistent with the user's head rotation. For example, if a sound is emanating from the user's right-hand side and the user rotates to face the sound, the audio reproduced during consumption of the virtual reality content sounds as if it is coming from in front of the user.

In some embodiments, the raw audio data is encoded with the directionality data that describes the directionality of the recorded sounds. The audio module 212 may analyze the directionality data to produce 3D audio data that changes the sound reproduced during playback based on the rotation of the user's head orientation. For example, the directionality of the sound may be rotated to match the angle of the user's head position. Assume that the virtual reality content depicts a forest with a canopy of tree limbs overhead. The audio for the virtual reality content includes the sound of a river. The directionality data indicates that the river is behind the user 134, and so the 3D audio data generated by the audio module 212 is configured to reproduce audio during playback that makes the river sound as if it is located behind the user 134. This is an example of the 3D audio data being configured to reproduce directionality. Upon hearing the audio for the river, the user 134 may sense that the river is behind him or her. The 3D audio data is configured so that as the user 134 tilts his or her head to the side, the sound of the water changes. As the angle of the tilt approaches 180 degrees relative to the starting point, the river sounds as though it is in front of the user 134. This is an example of the 3D audio data being configured to reproduce directionality based on the angle of the user's 134 head position. The 3D audio data may be configured so that the sound of the river becomes more distinct and clearer, and the user 134 has a better sense of how far the water is from the user 134 and how fast the water is flowing.

The stream combination module 214 may be software including routines for combining a stream of 3D video data and a stream of 3D audio data to generate virtual reality content. The stream combination module 214 is communicatively coupled to the bus 220 via a signal line 229. The stream of 3D video data includes a stream of left panoramic images for left eye viewing and a stream of right panoramic images for right eye viewing. Redundancy exists between the stream of left panoramic images and the stream of right panoramic images.

The stream combination module 214 may compress the stream of left panoramic images and the stream of right panoramic images to generate a stream of compressed 3D video data using video compression techniques. In some embodiments, within each stream of the left or right panoramic images, the stream combination module 214 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the stream combination module 214 may use one stream (either the stream of left panoramic images or the stream of right panoramic images) as a reference stream and may compress the other stream based on the reference stream. This compression may be referred to as inter-stream compression. For example, the stream combination module 214 may use each left panoramic image as a reference frame for a corresponding right panoramic image and may compress the corresponding right panoramic image based on the referenced left panoramic image.

In some embodiments, the stream combination module 214 may encode the stream of 3D video data (or compressed 3D video data) and 3D audio data to form a stream of virtual reality content. For example, the stream combination module 214 may compress the stream of 3D video data using H.264 and the stream of 3D audio data using advanced audio coding (AAC). In another example, the stream combination module 214 may compress the stream of 3D video data and the stream of 3D audio data using a standard MPEG format. The virtual reality content may be constructed by the stream combination module 214 using any combination of the stream of 3D video data (or the stream of compressed 3D video data), the stream of 3D audio data (or the stream of compressed 3D audio data), content data from the content server 139, advertisement data from the ad server 141, social data from the social network server 135, and any other suitable virtual reality content.

In some embodiments, the virtual reality content may be packaged in a container format such as MP4, WebM, VP8, and any other suitable format. The virtual reality content may be stored as a file on the client device 127 or the server 129 and may be streamed to the viewing system 133 for the user 134 from the client device 127 or the server 129. Alternatively, the virtual reality content may be stored on a digital versatile disc (DVD), a flash memory, or another type of storage devices.

The advertising module 216 may be software including routines for adding advertisements to the virtual reality content generated by the content system 131. For example, the ad server 141 stores and transmits advertisement data that describes one or more advertisements. The advertising module 216 incorporates the advertisements in the virtual reality content. For example, the advertisement includes an image, audio track, or video, and the advertising module 216 incorporates the advertisement into the virtual reality content. The advertisement may be a video that is stitched in the virtual reality content. In some embodiments, the advertisement includes an overlay that the advertising module 216 incorporates in the virtual reality content. For example, the overlay includes a watermark. The watermark may be an advertisement for a product or service. In some embodiments, the advertisements from the ad server 141 include ad data describing a location for displaying the advertisement. In this case, the advertising module 216 may display the advertisements according to the ad data. The advertising module 216 may be communicatively coupled to the bus 220 via a signal line 217.

In some embodiments, the advertisement data includes data describing how the advertisement may be incorporated in the virtual reality content. For example, the advertisement data describes where the advertisement may be included in the virtual reality content. The advertising module 216 may analyze the advertisement data and incorporate the advertisement in the virtual reality content according to the advertisement data. In other embodiments, the user 134 provides user input to the advertising module 216 and the user input specifies a user preference describing how the advertisement may be incorporated in the virtual reality content. The advertising module 216 may analyze the user input and incorporate the advertisement based at least in part on the user input.

Figure 3A:
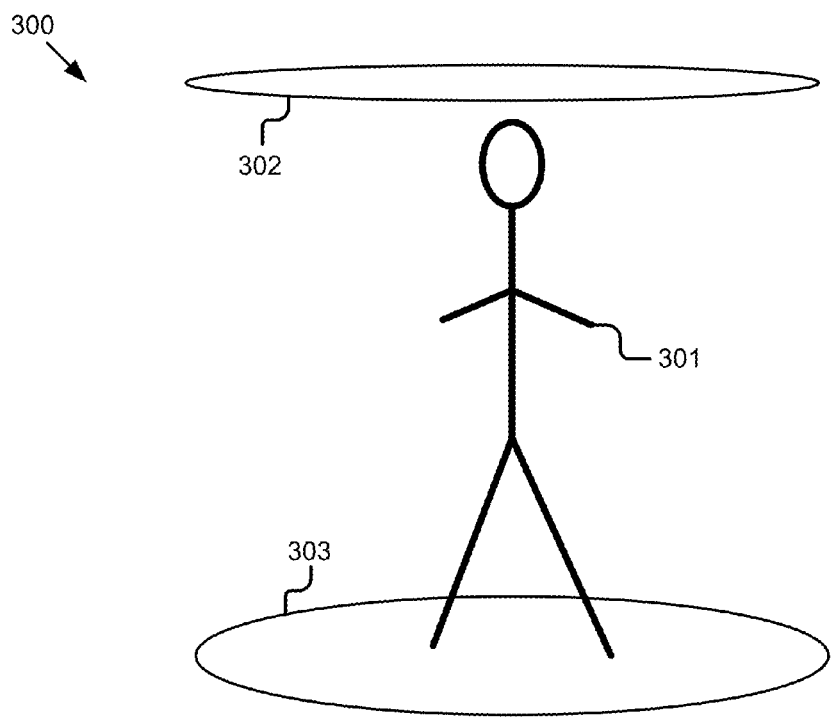
FIG. 3A illustrates different panels where virtual reality content may be displayed.

The advertisement may take many forms. For example, the advertisement may be a logo for a company or product placement of a graphical object that a user can interact with. In some embodiments, the advertising module 216 inserts the advertisement into an area where users commonly look. In other embodiments, the advertising module 216 inserts the advertisement into less commonly used areas. For example, FIG. 3A is an illustration 300 of a user 301 with virtual reality content displayed in a top panel 302 and a bottom panel 303. The user 301 is able to view the virtual reality content in the top panel 302 by moving his or her head upwards. The user 301 is able to view the virtual reality content in the bottom panel 303 by moving his or her head downwards.

Figure 3B:
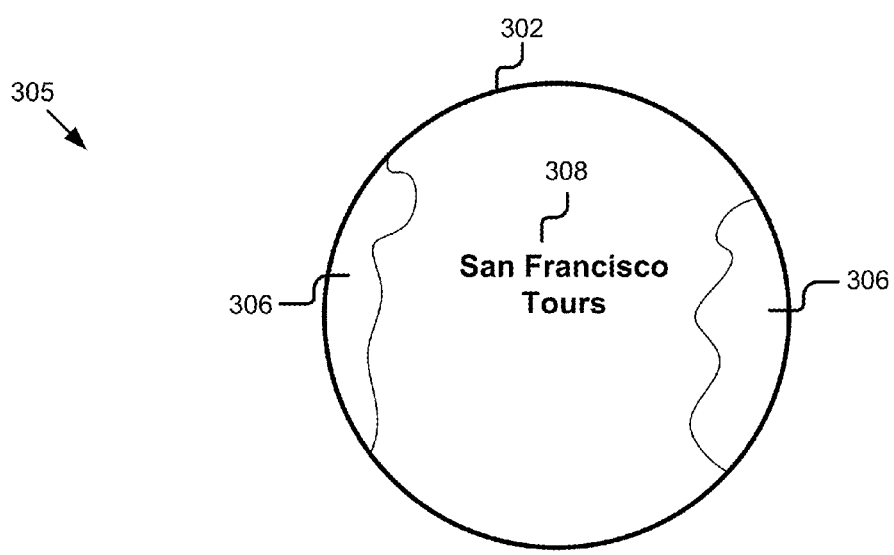
FIG. 3B illustrates an example advertisement that is displayed as part of the virtual reality content.

FIG. 3B is an illustration 305 of how the advertising module 216 might incorporate an advertisement into one of the panels in FIG. 3A. For example, FIG. 3B illustrates a top panel 302. The virtual reality content is of a forest. The user can see the edges of trees 306 in the top panel 302. In the center of the top panel 302, the advertising module 216 inserts an advertisement 308 for San Francisco tours. The top panel 302 may be a good place for advertisements because the advertisement does not overlap with virtual reality content that may be important for the user to view.

In some embodiments, the virtual reality content includes a stitching aberration caused by errors in generating the virtual reality content. An element of the content system 131 such as the correction module 210 analyzes the virtual reality content to identify the stitching aberration. The correction module 210 transmits data that describes the location of the stitching aberration in the virtual reality content to the advertising module 216. The advertising module 216 incorporates an advertisement at the location of the stitching aberration in the virtual reality content so that the stitching aberration is not visible to the user 134 upon playback of the virtual reality content.

In one embodiment, the advertising module 216 determines where to place advertisements based on determining a location of a user's gaze from viewing data. For example, the advertising module 216 receives data about how the user interacts with the virtual reality content from the viewing system 133. The viewing data may include a location within each frame or a series of frames where the user looks. For example, the user spends five seconds staring at a table within the virtual reality content. In another example, the advertising module 216 determines the location of user gaze based on where users typically look. For example, users may spend 80% of the time looking straight ahead.

The advertising module 216 may determine a cost associated with advertisements to charge advertisers. For example, the advertising module 216 charges advertisers for displaying advertisements from the ad server 141. In some embodiments, the advertising module 216 determines a cost for displaying the advertisement based on the location of the advertisement in the virtual reality content. The cost may be based on where the users look within a particular piece of virtual reality content, where users general look at virtual reality content, personalized for each user, etc. In some embodiments, the advertising module 216 determines a cost associated with interacting with advertisements. For example, similar to an online magazine that charges more money when a user clicks on an advertisement (click through), the advertising module 216 may charge more money when the advertising module 216 determines based on user gaze that a user looked at a particular advertisement. In some embodiments, the advertising module 216 generates links for the advertisements such that a user may select the advertisement to be able to view virtual reality content about the advertisement, such as a virtual reality rendering of the advertiser's webpage. The advertising module 216 may charge more for this action since it is also similar to a click through.

The advertising module 216 may determine one or more objects of interest based on the location of the user's gaze while viewing virtual reality content. The advertising module 216 may generate a profile for the user based on one or more objects of interest. The advertising module 216 may identify a category for the advertisement and determine that the user is interested in the category or the advertiser associated with the category. In some embodiments, the advertising module 216 determines a cost for displaying advertisements based on the one or more categories associated with the one or more objects of interest. For example, the advertising module 216 determines that a user is interested in potato chips, or is interested in a specific manufacturer of potato chips. As a result, the advertising module 216 charges more for displaying advertisements for potato chips to that user than other users without a demonstrated interest in potato chips.

The social module 218 may be software including routines for enabling the viewing system 133 or the content system 131 to interact with the social network application 137. For example, the social module 218 may generate social data describing the user's 134 interaction with the viewing system 133 or the content system 131. The interaction may be a status update for the user 134. The user 134 may approve the social data so that social data describing the user 134 will not be published without the user's 134 approval. In one embodiment, the social module 218 transmits the social data to the communication unit 245 and the communication unit 245 transmits the social data to the social network application 137. In another embodiment, the social module 218 and social network application 137 are the same. The social module 218 may be communicatively coupled to the bus 220 via a signal line 219.

In some embodiments, the social network application 137 generates a social graph that connects users based on common features. For example, users are connected based on a friendship, an interest in a common subject, one user follows posts published by another user, etc. In one embodiment, the social module 218 includes routines for enabling the user 134 and his or her connections via the social graph to consume virtual reality content contemporaneously. For example, the content system 131 is communicatively coupled to two or more viewing systems 133. A first user 134 is connected to a second user 134 in a social graph. The first user 134 interacts with a first viewing system 133 and the second user 134 interacts with a second viewing system 133. The first user 134 and the second user 134 may consume virtual reality content provided by the content system 131 using their respective viewing systems 133 simultaneously. In some embodiments, the consumption of the virtual reality content may be integrated with the social network.

In some embodiments, the social module 218 transmits information about user interactions with virtual reality content to the social network application 137. For example, the social module 218 may determine subject matter for an entire video or frames within the video. In another example, the social module 218 may identify objects within the virtual reality content that the user is interest in, based on the user's gaze. In some embodiments, the social module 218 may use a heat map to determine the user's interest in objects of interest as described in greater detail below. For example, the social module 218 may use at heat map that measures a user's gaze at different locations in the virtual reality content and illustrates the user's gaze with different colors based on a length of time the user spent looking at the different locations. The identity may be general, such as identifying a type of object (e.g., clothing or a person) or specific (e.g., a blue shirt made by a particular designer in 1993 or an identity of a person as determined by performing image recognition subject to user consent). The social module 218 may transmit information about the subject matter and the user to the social network application 137, which generates a social graph based on shared subject matter. For example, the social module 218 may transmit the identity of the object, a link to purchasing the object, an identity of a member of the social network (subject to the member's consent to the member's information being used to make an identification) that was an object of interest for the user, etc.

In some embodiments, the social module 218 receives information about how the user reacts to advertisements from the viewing system 133 and transmits the information to the social network application 137 for incorporation into the social graph. The social module 218 may determine the user's reaction based on receiving data indicating whether a user was smiling, darting their eyes, experiencing pupil dilation, experiencing an increased heart rate, perspiring, etc. For example, the viewing system 133 transmits information about how the user's gaze indicates that the user is interested in advertisements about home decorating. The social module 218 transmits the user's interest in home decorating to the social network application 137, which updates the user's profile with the interest and identifies other users that the user could connect with that are also interested in home decorating. In another embodiment, the social network application 137 uses the information about advertisements to provide advertisements within the social network to the user.

In some embodiments, the social network application 137 suggests connections between users based on their interactions with the virtual reality content. For example, if both a first user and a second user access the same virtual reality content, the social network application 137 may suggest that they become friends. In another example, if two users access virtual reality content with the same subject matter, the social network application 137 suggests that they become connected. In yet another example, where a first user on the social network is an expert in a type of subject matter and the second user views a threshold number of pieces of virtual reality content with the same subject matter, the social network application 137 suggests that the second user follow the first user in the social network.

The social network application 137 may suggest that the user join groups in the social network based on the user's consumption of virtual reality content. For example, for a user that views virtual reality content that involves science fiction adventures with other users, the social network application 137 suggests a group in the social network about science fiction roleplaying.

In some embodiments, the social module 216 transmits information about user interactions to the social network application 137 that the social network application 137 uses for posting updates about the user. The update may include information about the type of user interaction that is occurring, information about the virtual reality content, and a way to access the virtual reality content. The social network application 137 may, subject to user consent, post an update about a first user's actions related to the virtual reality content to other users in the social network that are connected to the first user via a social graph. For example, the update is viewed by friends of the first user, friends of friends of the first user, or a subset of connections of the first user including only close friends. The social network application 137 may also post the update to other users that have viewed the same virtual reality content or demonstrated an interest in subject matter that is part of the virtual reality content.

In some embodiments, the social network application 137 determines subject matter associated with the virtual reality content and determines other users that are interested in the subject matter. For example, the social network application 137 determines that users are expressly interested in the subject matter because it is listed as part of a user profile that they created during registration. In another example, the social network application 137 uses implicit activities to determine interest in the subject matter, such as a user that watches a predetermined number of videos with the subject matter or posts a predetermined number of articles about the subject matter. The social network application 137 may limit social network updates about user interactions with virtual reality content to other users that are interested in the same subject matter.

In some embodiments, the social network application 137 posts updates as long as the virtual reality content is not sensitive. For example, the social network application 137 may compare the subject matter to a list of user-approved subject matter and/or a list of user-disapproved subject matter to prevent disclosure of private or embarrassing information, such as if the user does not want the user's friends knowing about the user's obsession with Civil War surgical instruments. In some embodiments, the social network application 137 provides users with user preferences about the type of subject matter that cannot be part of the updates. For example, where the social network is for business connections, the social network application 137 does not post updates about users consuming virtual reality content involving celebrities.

Figure 3C:
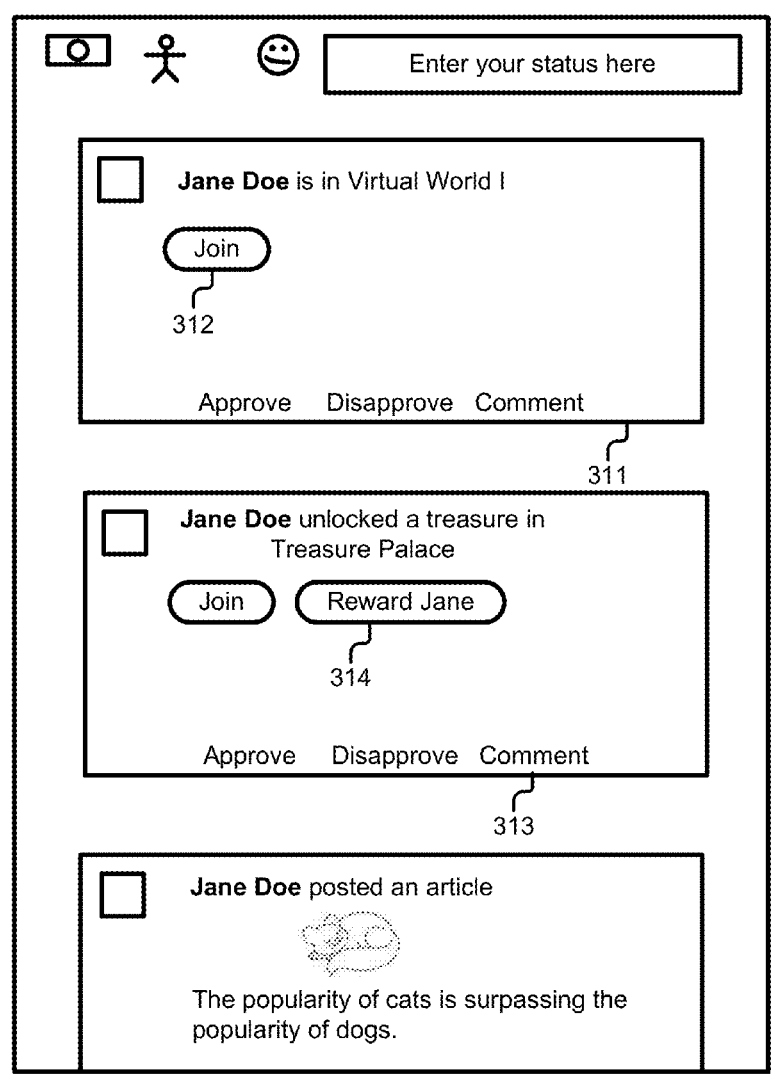
FIG. 3C illustrates example social network content.

FIG. 3C is an example illustration 310 of a profile page of social network updates for a user. In this example the user Jane Doe has had user interactions with virtual reality content for Virtual World I and Treasure Palace. The first update 311 of virtual reality content includes identification of the user, a join button 312, and links for approving, disapproving, or commenting on the update. If a user clicks the join button 312, in one embodiment, the social network application 137 instructs the content system 131 to launch. The approval link can take many forms, such as like, +1, thumbs up, etc. The disapproval link can take many forms, such as −1, dislike, thumbs down, etc.

The second update 313 of virtual reality content includes a status update about the user's progress in a virtual reality game. In this example, another user may be able to provide in-game rewards to the user by selecting the reward Jane button 314. For example, selecting the button could cause the social network application 137 to instruct the content system 131 to provide the user with an additional life, credits for purchasing objects in the same, time, etc.

The content module 256 may be software including routines for enabling the content system 131 to receive content from the content server 139 and, in some embodiments, provide analysis of virtual reality content. For example, the content server 139 stores content such as videos, images, music, video games, or any other VR content suitable for playback by the viewing system 133. The content module 256 may be communicatively coupled to the bus 220 via a signal line 257.

In some embodiments, the content server 139 is communicatively coupled to a memory that stores content data. The content data includes video data or audio data. For example, since a video may include a series of images synchronized with a corresponding audio track, a video stored on the content sever 139 has a video element and an audio element. The video element is described by the video data and the audio element is described by the audio data. In this example, the video data and the audio data are included in the content data transmitted by the content server 139. The content system 131 receives the content data and proceeds to generate virtual reality content for the viewing system 133 based at least in part on the video data and the audio data included in the content data. Similar examples are possible for images, music, video games, or any other content hosted by the content server 139.

In some embodiments, the content module 256 provides analysis of the virtual reality content. For example, the content module 256 may receive information about the location of all users' gazes and aggregate the information. The content module 256 may generate a heat map where different colors correspond to a number of users that looked at a particular location in the image. For example, where the image is a room in a kitchen, the heat map illustrates that most users looked at the kitchen table and appliances and fewer users looked at the wall.

The content module 256 may use analytics data to generate playlists of virtual reality content. For example, the content module 256 may determine the popularity of different virtual reality experiences. The popularity may be based on a number of users that access the virtual reality content, user ratings after a user has interacted with the virtual reality content, etc. The playlists may be topic based, such as the 10 best depictions of Paris, France or may be based on overall popularity, such as the 50 best virtual reality content available. In some embodiments, the content module 256 generates playlists from people that are experts in subject matter. For example, the content module 256 generates a playlist of the best cooking videos as rated (or created) by well-known chefs. In another example, the content module 256 accepts playlists created by experts, such as the best virtual reality content about technology that was submitted by an owner of a billion-dollar technology company.

In some embodiments, the content module 256 manages gamification of the virtual reality content. The content module 256 may track user interactions with the virtual reality content and provides rewards for achieving a threshold amount of user interactions. For example, the content module 256 rewards a user with new virtual reality content when the user identifies five objects in the game. The content module 256 may also provide clues for how to find the objects.

Figure 3D:
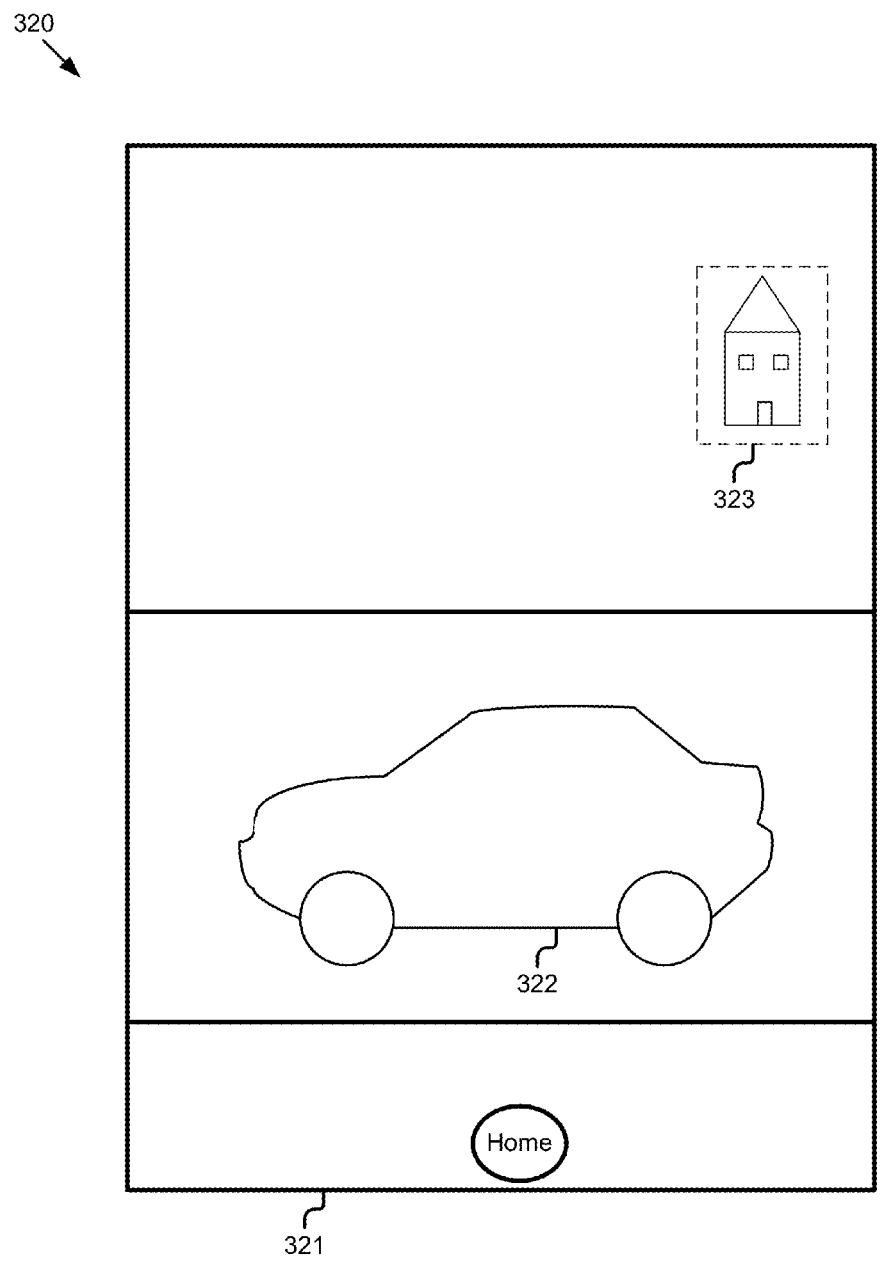
FIG. 3D illustrates example virtual reality content that includes a link to additional virtual reality content.

In some embodiments, the content module 256 generates links within virtual reality content for users to move from one virtual reality experience to another. FIG. 3D illustrates 320 an example of virtual reality content 321 where the user is experiencing walking around and approaching a road with cars 322 on the road. In the upper right-hand corner is a linked image 323 that the user could select to access virtual reality content of a house. The user may use a peripheral device, such as a glove to reach out and touch the linked image 323. In some embodiments, the content system 131 recognizes a particular motion for accessing the linked image 323, such as making a tap with an index finger similar to using a mouse to click on an object. The user may also access a peripheral device, such as a mouse, to position a cursor on the screen to select the linked image 323.

Example Methods

Figure 4A:
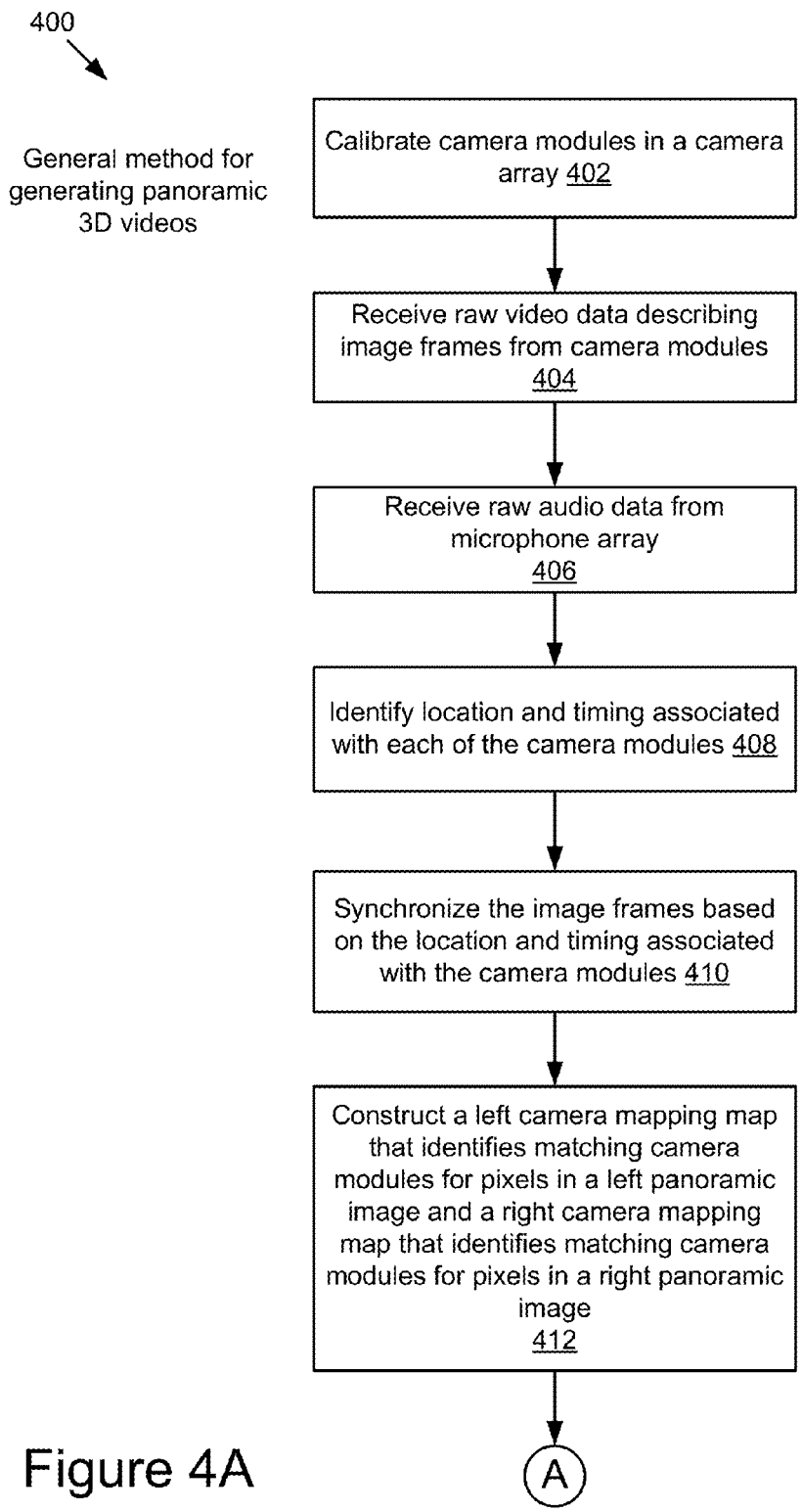
FIG. 4A-4C illustrate an example method for aggregating image frames and audio data to generate VR content according to some embodiments.
Figure 4B:
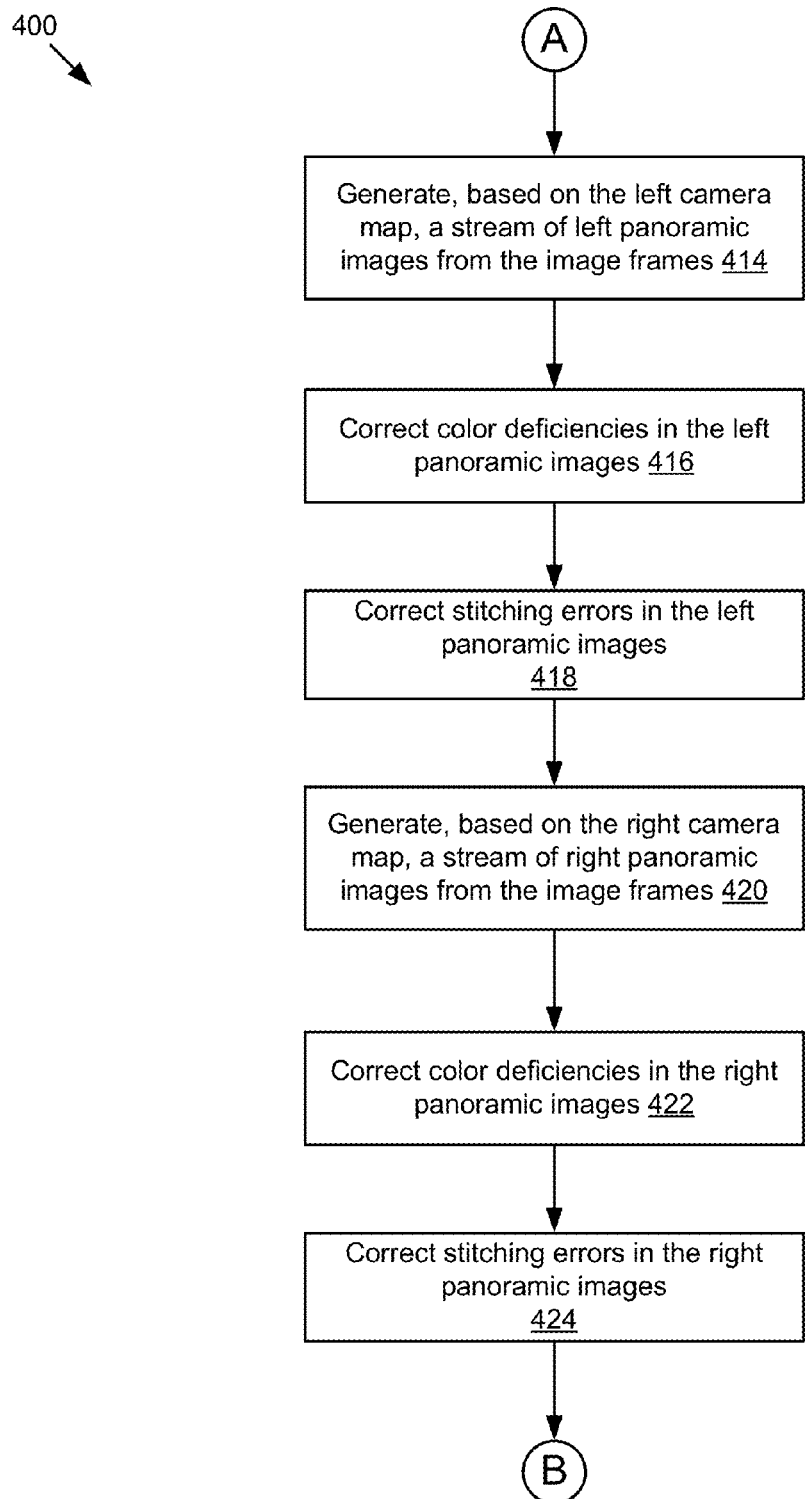
Figure 4C:
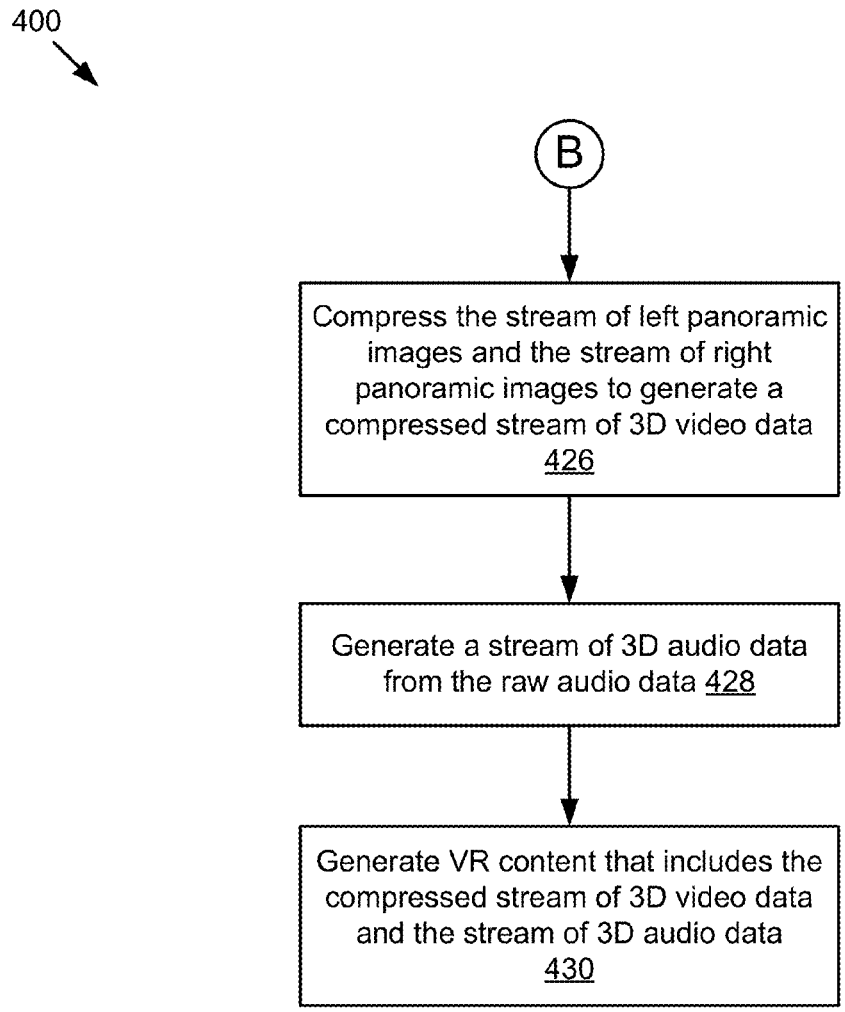

FIGS. 4A-4C illustrate an example method 400 for aggregating image frames and audio data to generate virtual reality content according to some embodiments. The method 400 is described with respect to FIGS. 1 and 2. Although illustrated as discrete blocks, various blocks may be divided into additional blocks, combined into fewer blocks, or eliminated, depending on the desired embodiment.

Referring to FIG. 4A, the calibration module 204 calibrates 402 the camera modules 103 in the camera array 101. The communication module 202 receives 404 raw video data describing image frames from the camera modules 103. The communication module 202 receives 406 raw audio data from the microphone array 107. The video module 208 identifies 408 a location and timing associated with each of the camera modules 103. The video module 208 synchronizes 410 the images frames based on locations and timings associated with the camera modules 103. The camera mapping module 206 constructs 412 a left camera map and a right camera map. The left camera map identifies matching camera modules 103 for pixels in a left panoramic image. For example, for a pixel in a left panoramic image that represents a point in a panorama, the left camera map identifies a matching camera module 103 that has a better view to the point than other camera modules 103. Similarly, the right camera map identifies matching camera modules 103 for pixels in a right panoramic image.

Referring to FIG. 4B, the video module 208 generates 414, based on the left camera map, a stream of left panoramic images from the image frames. For example, the video module 208 identifies matching camera modules 103 for pixels in left panoramic images based on the left camera map. For a particular time frame, the video module 208 stitches image frames synchronized at the particular time frame from the corresponding matching camera modules 103 to form a left panoramic image for the particular time frame. The correction module 210 corrects 416 color deficiencies in the left panoramic images. The correction module 210 corrects 418 stitching errors in the left panoramic images.

The video module 208 generates 420, based on the right camera map, a stream of right panoramic images from the image frames. For example, the video module 208 identifies matching camera modules 103 for pixels in right panoramic images based on the right camera map. For a particular time, the video module 108 stitches image frames synchronized at the particular time from the corresponding matching camera modules 103 to form a right panoramic image for the particular time. The correction module 210 corrects 422 color deficiencies in the right panoramic images. The correction module 210 corrects 424 stitching errors in the right panoramic images.

Referring to FIG. 4C, the stream combination module 214 compresses 426 the stream of left panoramic images and the stream of right panoramic images to generate a compressed stream of 3D video data. The audio module 212 generates 428 a stream of 3D audio data from the raw audio data. The stream combination module 214 generates 430 VR content that includes the compressed stream of 3D video data and the stream of 3D audio data. In some embodiments, the stream combination module 214 may also compress the stream of 3D audio data to form a compressed stream of 3D audio data, and the VR content may include the compressed stream of 3D video data and the compressed stream of 3D audio data.

Figure 5:
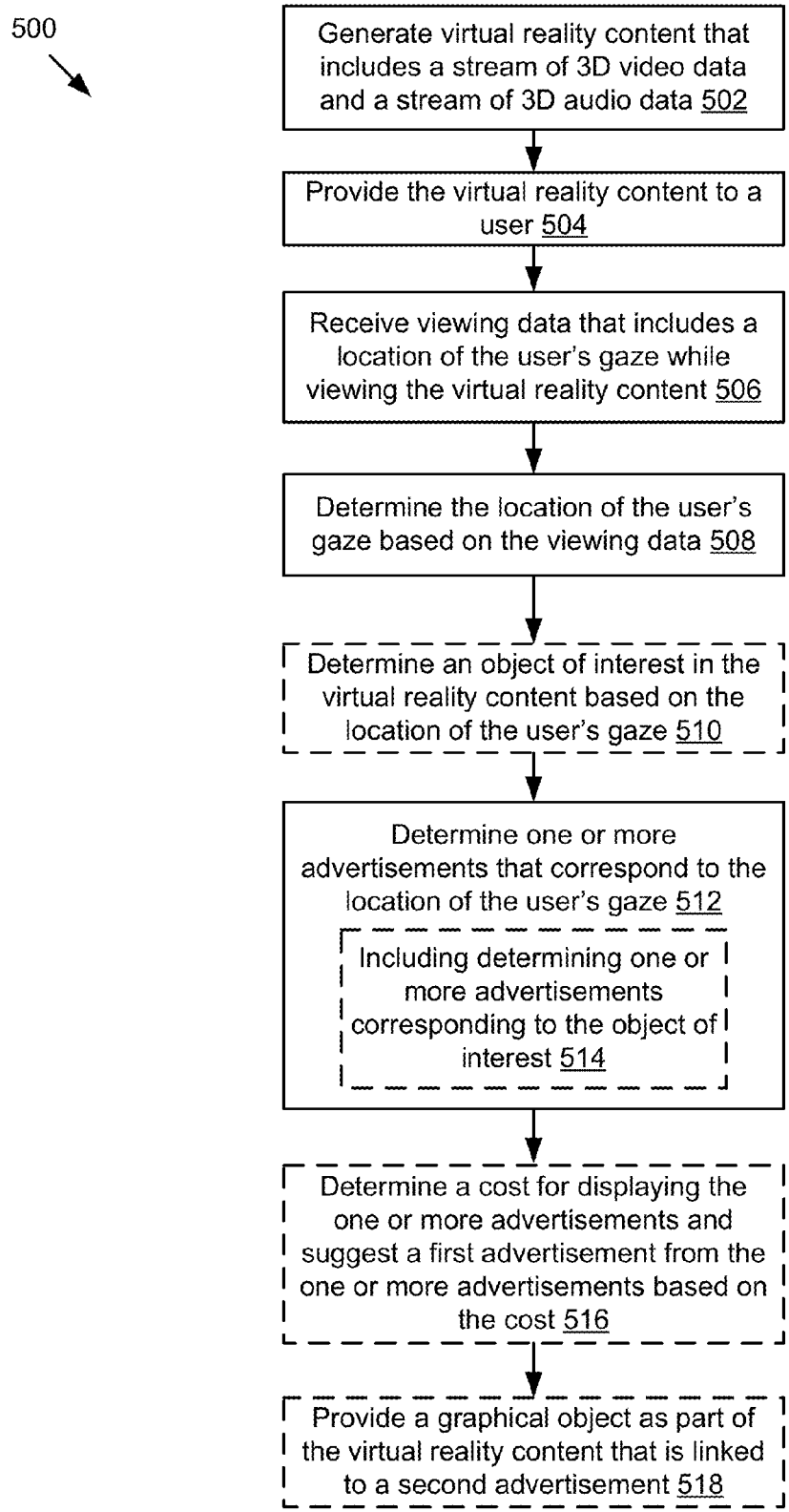
FIG. 5 illustrates an example method for generating advertisements in a virtual reality system.

FIG. 5 illustrates an example method 500 for generating advertisements in a virtual reality system. The method 500 is described with respect to FIGS. 1 and 2. Although illustrated as discrete blocks, various blocks may be divided into additional blocks, combined into fewer blocks, or eliminated, depending on the desired embodiment.

The stream combination module 214 generates 502 virtual reality content that includes a stream of three-dimensional video data and a stream of three-dimensional audio data. The stream combination module 214 provides 504 the virtual reality content to a user. The advertising module 216 receives 506 viewing data that includes a location of the user's gaze while viewing the virtual reality content. The advertising module 206 determines 508 the location of the user's gaze based on the viewing data. For example, the advertising module 216 receives viewing data from the viewing system 133 or the advertising module 216 uses statistical information about where users typically look in virtual reality content. In some embodiments, the advertising module 216 determines 510 an object of interest in the virtual reality content based on the location of the user's gaze. The advertising module 216 determines 512 one or more advertisements that correspond to the location of the user's gaze. The advertising module 216 may also determine 514 the one or more advertisements corresponding to the object of interest.

In some embodiments, the advertising module 216 determines 516 a cost for displaying the one or more advertisements and suggests a first advertisement from the one or more advertisements based on the cost. The cost may be based on a location of the one or more advertisements in the virtual reality content and one or more categories associated with each of the advertisements. For example, the cost may be higher for regions where the user more commonly looks.

In some embodiments, the advertising module 216 provides 518 a graphical object as part of the virtual reality content that is linked to a second advertisement. For example, the graphical object includes a soda can that the user can touch to access a second advertisement. The second advertisement may be displayed as part of the virtual reality content, such as a pop up window that appears above the object. Alternatively, the second advertisement may be part of another application that is activated by the ad server 141, such as by providing the user with access to a third-party website, responsive to the user selecting the graphical object.

Figure 6:
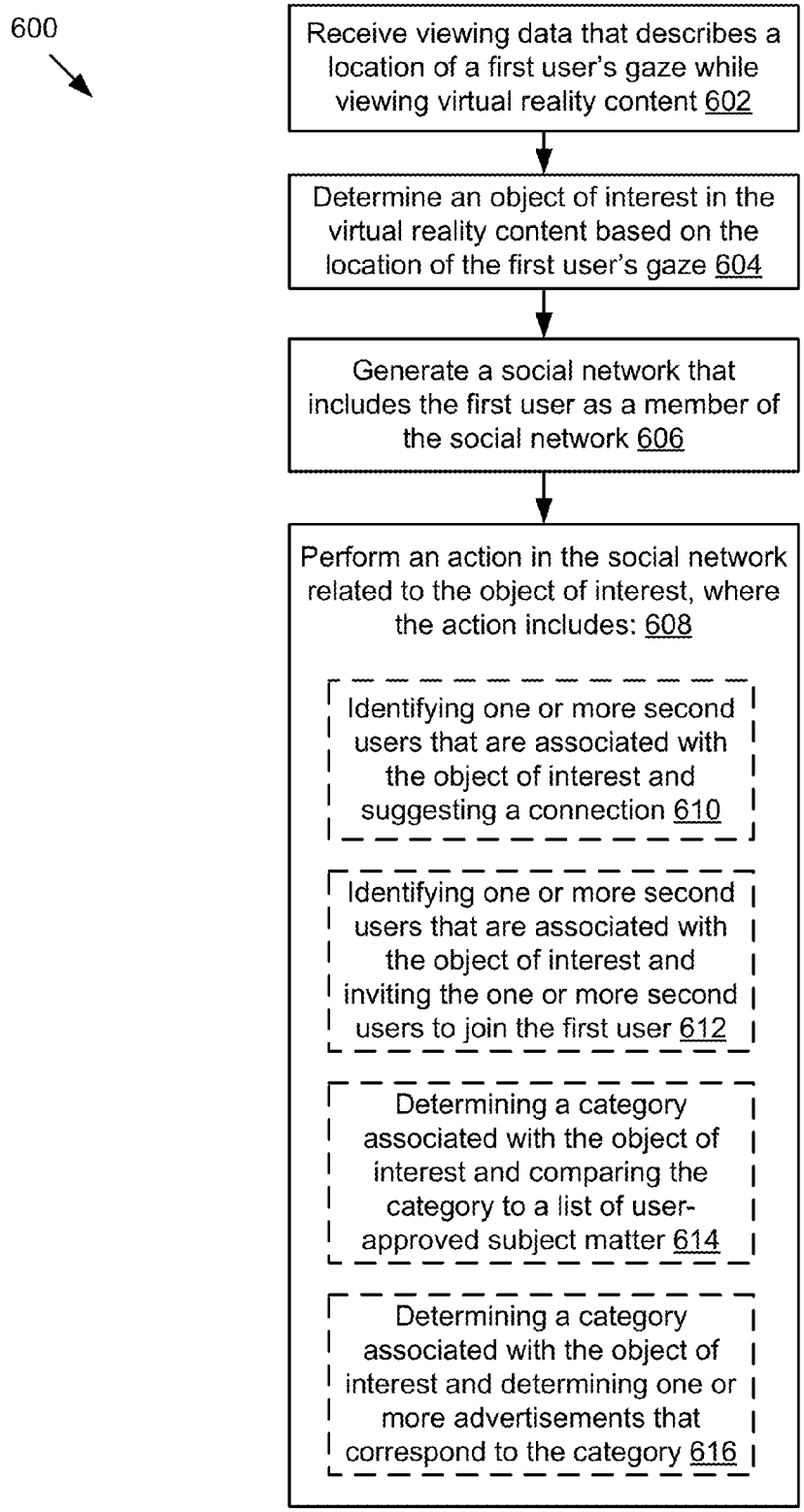
FIG. 6 illustrates an example method for generating a social network based on virtual reality content.

FIG. 6 illustrates an example method 600 for generating a social network based on virtual reality content. The method 600 is described with respect to FIGS. 1 and 2. Although illustrated as discrete blocks, various blocks may be divided into additional blocks, combined into fewer blocks, or eliminated, depending on the desired embodiment. Although the method 600 is described as a social network application 137 performing steps on a social network server 135 that is separate from the content system 131, the method steps may also be performed by the social module 218 that is part of the content system 131.

The social network application 137 receives 602 viewing data that describes a location of a first user's gaze while viewing virtual reality content. The social network application 137 determines 604 an object of interest in the virtual reality content based on the location of the first user's gaze. The social network application 137 generates 606 a social network that includes the first user as a member of the social network. For example, the social network connects users based on a shared attribute.

The social network application 137 performs 608 an action in the social network related to the object of interest. The action may include identifying 610 one or more second users that are associated with the object of interest and suggesting a connection, for example, between the first user and the one or more second users in the social network. For example, users are connected in the social network based on users that message each other within the virtual reality world. In another example, the social network application 137 makes a suggestion where the first and second users view the same virtual reality content.

The action may include identifying 612 one or more users that are associated with the object of interest and inviting the one or more second users to join the first user. For example, the social network application 137 may generate a link for the one or more second users to view the same virtual reality content, such as by clicking on buttons in the social network to launch the content system 131.

The action may include determining 614 a category associated with the object of interest and comparing the category to a list of user-approved subject matter. For example, the social network application 137 may compare the category to the list of user-approved subject matter to determine whether the category is in the list and, responsive to the category being in the list, automatically generate a social network update that describes the user's interaction with the virtual reality content. The social network application 137 may generate the social network update when a user begins to interact with the virtual reality content, achieves a goal, etc.

The action may include determining 616 a category associated with the object of interest and determining one or more advertisements that correspond to the category. For example, the social network application 137 (or the advertising module 216) may provide the one or more advertisements as part of the virtual reality content and update a user profile associated with the first user to include information about at least one of the category and the one or more advertisements.

The action may include determining 618 a category associated with the object of interest and suggesting a group associated with the social network based on the category. For example, the social network application 137 may suggest that the first user join a group about travelling to South America based on the first user viewing animals in the virtual reality content that are common to South America.

Figure 7:
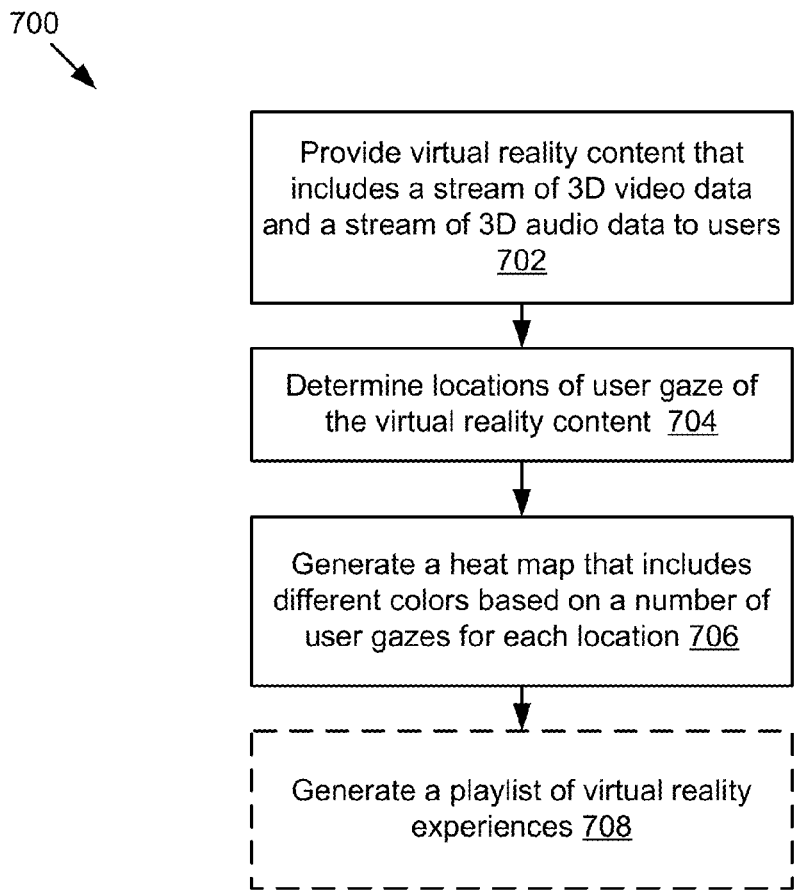
FIG. 7 illustrates an example method for analyzing virtual reality content.

FIG. 7 illustrates an example method 700 for analyzing virtual reality content. The method 700 is described with respect to FIGS. 1 and 2. Although illustrated as discrete blocks, various blocks may be divided into additional blocks, combined into fewer blocks, or eliminated, depending on the desired embodiment.

The stream combination module 214 provides 702 virtual reality content that includes a stream of three-dimensional video data and a stream of three-dimensional audio data to users. The content module 256 information about user gaze, for example, from the viewing system 133 after the stream is displayed. The content module 256 determines 704 locations of user gaze of the virtual reality content and generates 706 a heat map that includes different colors based on a number of user gazes for each location. For example, the heat map uses red to illustrate the most commonly viewed area, orange for less commonly viewed, and yellow for least commonly viewed. In one embodiment, the content module 256 generates 708 a playlist of virtual reality experiences. For example, the playlist includes most viewed virtual reality content, most highly rated virtual reality content, a playlist for a particular region, or a playlist from an expert in certain subject matter.

Avatar

In some embodiments, the virtual reality content may include avatars representing one or more users of the virtual reality system. The avatars may be a graphical representation of the user or the user's alter ego or character. The avatar may be fanciful (e.g., a graphical representation of the user that does not look like the user in real life) or realistic (e.g., a graphical representation of the user that looks similar or has some similar characteristics of the user in real life). Realistic avatars may be photorealistic or merely suggestive of the user as the user exists in real life.

As mentioned above, the social graph may include the user's relationships. In some embodiments, these relationships may be characterized by friendship. For example, a first user has a social graph. The social graph may include data indicating that the first user is friends with a second user. In some embodiments, the first user and the second user may interact with each other in the virtual reality content. For example, one or more of the first user and the second user are represented by an avatar in the virtual reality content. The avatars may interact with each other. The interaction may include vocal communication. For example, the first user may say "Look here!" to the second user as the first user swivels in their chair.

In some embodiments, the interaction of friends may include synchronized viewing of virtual reality content by time code. For example, the first user and the second user may watch a movie together. Any number of users may watch a virtual reality movie together at the same time or approximately the same time. Instead of a movie, the virtual reality content may be live events such as sporting events or concerts. In some embodiments, the users may be able to text other people or other users while watching the virtual reality content.

In some embodiments, the movie includes audio and visual content. In other embodiments, the movie includes one of audio or visual content.

The system 200 may include hardware or software to monitor the movement of users in the real world. The user may be able to control the movement of their avatar by their body movement, head movement or facial expression. For example, the user moves a portion of their body in the real word and the system 200 causes the avatar to move a corresponding portion of its body in the virtual world of the virtual reality content. A first user may use this feature of the system 200, for example, to cause their avatar to dance or make other sequences of motions while watching a concert or just listening to music. Other users can see the first user dancing in the virtual world. The other users may see the first user in real time or near real time.

Alternatively, the first user's dancing avatar may be recorded for later playback and viewing by the first user or other users. The recorded virtual reality content may include one avatar dancing or a collection of many avatars dancing. For example, many users may dance to music to cause their avatars to dance. The system 200 may record this as virtual reality content for later playback. If the users speak or text one another, the system may record this user input and include it in the recorded virtual reality content for later playback.

Similarly, the user may make a facial expression in the real world, and the system 200 may cause the avatar to make a similar or same expression in the virtual world. The facial expression of the avatar may be included in recorded virtual reality content for later playback or viewed in real time or near real time by other users.

The system 200 may include an online store where users can purchase different avatars or outfits for their avatars. The system 200 may also allow the users to purchase virtual reality content or music for playback. In some embodiments, recording the user's interaction with the system 200 or storing this interaction in the cloud for later playback is a premium feature available for purchase via the online store.

In some embodiments, the gaze of the avatar's heads are monitored and tracked. The gaze of the avatars may be stored in the social graph. The elapsed time of the gaze at may also be stored in the social graph. If the gaze was directed at an object or combination of objects in the virtual reality content, then this too may be stored in the social graph. For example, if an avatar gazes at a certain object for four seconds, then data may be stored in the social graph indicating that a user associated with the avatar gazed at a certain object for four seconds. The identity of the object may be stored in the social graph as well. Similar to heat maps, gaze maps may be generated based on the information describing the gaze of an avatar.

Example Benefits of Heat Map or Gaze Map

Use of heat maps or gaze maps with the social graph was described above. One example benefit to heat maps or gaze maps is to assist virtual reality content makers or advertisers in determining whether they have achieved their goal. For example, advertisers may use this information to determine where to place advertisements in virtual reality content. In another example, the heat map may be used to determine objects of interest in the virtual reality content. Virtual reality content makers may use this information to determine if the user is having the intended experience or enjoying the virtual reality content.

The heat maps or gaze maps may describe a biological function of a user as they are viewing content. For example, the heat maps or gaze maps may include data indicating whether a user was smiling, darting their eyes, experiencing pupil dilation, experiencing an increased heart rate, perspiring, etc. The biological function data may be acquired using sensors such as a camera, heart rate meter, perspiration monitor, accelerometer, etc. These sensors may be included in a device or any combination of devices. The devices may include wearable such as a smart watch or a smart health meter.

Store What User has Watched in the Social Graph and Determine Correlations

In one embodiment, the system 200 may monitor, track and store data in the social graph describing the virtual reality content that was watched by a user. The system 200 may do this for two or more users included in the social graph. The system 200 may include functionality to determine correlations between users based on the virtual reality content they have consumed. The system 200 may make recommendations to a user based on these correlations. For example, the system 200 may recommend content to a first user based on the virtual reality content consumption of one or more other users. The system 200 may also recommend new relationships to a user based on these correlations.

In one embodiment, a first user may be watching virtual reality content that may be of interest to a second user. For example, a first user is watching a music concert that is rendered as virtual reality content. The system 200 may analyze the data stored in the social graph to determine that a second user may be interested in consuming this content at the same time as the first user. They system 200 may then present a message to the second user including a suggestion for them to watch the music concert with the first user. The message may include a link or element that the second user can select to begin watching the music concert with the first user.

In one embodiment, the system 200 may include functionality to present a two dimensional view of what friends are looking at in real time or from an earlier time. For example, a friend uses their browser to visit the website for a social network and is able to view a two dimensional view of what one of their friends are viewing in virtual reality content. The two dimensional view may serve as a preview before joining a friend at a live event, a status update shared by the friend to the social network, a private message transmitted from friend to friend, etc. The two dimensional view may be a video stream or a frame from a video. In some embodiments, the two dimensional view is a live two dimensional video stream of what a user is currently viewing.

The system 200 may also include functionality to present a collage of what many viewers see in one or more pieces of virtual reality content. The collage may be formed from what many users are viewing. The collage may be composed of one or more video streams (one stream per user included in the collage), an individual frame from a video (one frame per user included in the collage) or a combination of video streams and individual frames. In some embodiments, the two dimensional view is a live two dimensional video stream of what a user is currently viewing.

Gaze Assistance

In one embodiment, the system 200 uses the heat maps to determine where one or more users are looking. For example, analysis of one or more heat maps may indicate that users frequently look in particular direction when watching a given piece of virtual reality content. Subsequent users may benefit from this information since it may help them to know where they should be looking when watching the virtual reality content. The system 200 may present recommendations to users about where they should be looking when viewing virtual reality content. The recommendations may be audio cues, visual cues or a combination of audio and visual cues.

In some embodiments, the visual cues may include blurring every portion of the virtual reality content except for the recommended location where the user should be viewing.

In some embodiments, a director may be included in the virtual reality content. The director may provide audio or visual cues to assist the user in knowing where to look when viewing the virtual reality content.

In some embodiments, the recommendations may include avatar heads at the bottom of the screen. The user may mimic the behavior of the avatars. If the user mimics the behavior of the avatars, then the user will be looking in the recommended direction.

Ad Network

As described above, in some embodiments the virtual reality content may be associated with an advertisement. The advertisements may be linked to a tagged object in the virtual reality content. For example, assume that the virtual reality content includes an object. The object may be one that advertisers think is likely to draw a user's attention. For example, the object is a movie star or a portion of the movie star's wardrobe. The movie star may be considered by advertisers to be someone that users are likely to look at while viewing the virtual reality content. The advertisers may pay to have an advertisement that will appear when certain viewers gaze at the movie star. For example, the system 200 determines that a user's social network profile indicates that they have an interest in purchasing shoes. The user is watching virtual reality content that includes the movie star. The system 200 includes functionality to detect the gaze of the user and determine whether the user is gazing at the movie star or the movie star's shoes. If the user then looks at the movie star's shoes, then the system may present a personalized advertisement to the user including shoes similar to the shoes being worn by the movie star.

In some embodiments, the system 200 may include functionality to enable advertisers to pay the operators of the system 200 a fee in exchange for the advertisement. The fee may be greater if the user makes a purchase or takes some other action after viewing the advertisement. The price of the fee may be tied to the heat map. For example, the advertisement fee may be greater for advertisement placement in an area where the heat map indicates greater historical user interest.

Instead of linking advertisements to objects, the system 200 may include functionality to link advertisements to the user's movements, expressions, biological functions or emotions. For example, the system 200 may include functionality to detect that the user is smiling. The system 200 may include instructions to serve the user an advertisement when the user smiles. Similarly, the system 200 may detect other movements, expressions or biological functions of the user and then present an advertisement based off this detection event. In some embodiments, the system 200 may infer the user's emotions based on their movements, expressions or biological functions, and then serve them an advertisement based on their emotion.

The system 200 may temporarily modify the virtual reality content to make an advertisement more effective. For example, the virtual reality content may be temporarily blurred or darkened in every direction except the location of the advertisement. Similarly, the virtual reality content may be modified to include graphical overlays such as arrows or similar shapes to direction a user's gaze to the advertisement. If the user is sitting in a motorized chair, the system 200 may include functionality to swivel or tilt the chair so that the user's gaze is in the direction of an advertisement.

In one embodiment, the system 200 may include functionality to create a profile describing one of more users. The profile may indicate the user's interests, hobbies, purchasing habits, approximate expendable income, etc. The profile may be created based on the user's interactions with the social network, inferences drawn from the user's data as correlated with other user's data, the user's virtual reality content usage, etc. This profile may then be used to assist advertisers or to determine fees for advertisers.

Gamefication of Virtual Reality Content or Experiences

In some embodiments, the advertisements are linked to objects that are configured to be harder to find as a form of gameification associated with the advertisement. Persons having ordinary skill in the art may refer to the object as an "Easter egg." In these embodiments, the advertisement may be considered a reward for the user. For example, the object is a soft drink can that is hard to locate in the scene, but if the user is able to find the object and gaze at it, the user will be presented with an advertisement associated with the soft drink. The advertisement may be funny or include content that the advertisers think will be considered desirable by the user. For example, the object is a movie poster for a movie that has not been released. The user's social network profile indicates that the user has an interest in seeing the movie. The user gazes at the movie poster. The system 200 detects the user's gaze and has previously determined the user's interest in this movie. Upon detecting the user's gaze, the system 200 presents the user with a limited release trailer for the movie that includes special previews that will not be included in other trailers for the movie. In this instance, the advertisement may be desirable to the user. The advertisement may include promotional material such as a code or coupon that makes it desirable for the user to go see the movie when it is released.

In some embodiments, the gamefication may include requiring the user to complete a number of tasks or having certain predetermined interactions before they can access certain virtual reality experiences. For example, the user must collect X number of objects before the user will get access to a certain virtual reality experience. The user may select an object using one or more gestures or other inputs. For example, the user points at an object and the system 200 detects the pointing and determines that the user is pointing at the object to be collected. The user may also point and click at an object. For example, the user points at the object while tapping his foot on the floor or speaking a reserved keyword that indicates a click.

In some embodiments, the user may receive a different reward for completing tasks. For example, the user may receive points, cash, virtual currency, credits or some other reward for completing tasks. The reward may be redeemable in the online store of the system 200.

Virtual Reality Experiences Associated with Mobile Devices

The system 200 may be linked to mobile devices. These mobile devices may include smart watches, health meters, smart glasses, smart phones, etc. In one embodiment, the advertisements provided by the system 200 may be linked to the user's inputs to one or more of these mobile devices. For example, the user is wearing a pair of smart glasses. The user views a movie poster in real life. The user provides an input to indicate that they are interested in the movie poster. For example, the user says a phrase or keyword that indicates his interest in the object he is viewing. The user may also make a gesture to indicate interest in the viewed object. The smart glasses may be linked to the system 200 to provide information about the user's interests to the system 200. In some embodiments, the smart glasses may be linked to the social network and provide the system 200 with inputs describing the user's interests via the social network. Later, when the user is watching virtual reality content, the system 200 may provide the user with an advertisement based on the user's interest in the object they viewed using the smart glasses.

In one embodiment, the smart glasses include functionality to provide the user with virtual reality content. For example, the user indicates interest in an object such as a movie poster as described in the previous paragraph. After a passage of a period of time, the user may be sitting at a coffee shot or some other location where the user may safely view virtual reality content. The virtual reality content may include an advertisement for the movie associated with the movie poster.

In one embodiment, the system 200 includes functionality so that a user can begin watching virtual reality content using virtual reality goggles and then switch to watching the same virtual reality content on a different device such as a smart watch, smart glasses, smart phone, etc. The virtual reality experience may be continuous for the user from location to location and from device to device. For example, when the user switches for the virtual reality googles to the other device, the other device begins presenting the virtual reality content in the same or substantially the same location as where the user left off when viewing the virtual reality content on the virtual reality goggles.

In one embodiment, different devices may be able to share virtual reality content via a pear-to-pear network.

Geolocation and Virtual Reality Content

In one embodiment, the user travels places in the real world while also carrying a mobile device such as a smartphone, smart watch or some other device that includes a global positioning system chip (GPS chip) to track the user's movements. The mobile device syncs the GPS data describing the user's travels to the system 200. The system 200 then provides the user with virtual reality content that is associated with the locations visited by the user. Other method besides GPS may be used to locate people. For example, WiFi signals may be used to locate people.

In some embodiments, the user tags locations they have visited in a social network. The system 200 then provides the user with virtual reality content that is associated with the locations tagged by the user. The virtual reality content may be consumed by the user while at the location or at a later time.

In some embodiments, if two users visited a location together in the real world, the system 200 will provide the two users with a synchronized virtual reality experience that they share together. This synchronized virtual reality experience may be associated with the location visited together by the users in the real world.

Voice Searching for Virtual Reality Content

In one embodiment, the system 200 includes a corpus of keywords or phrases that are linked to different virtual reality content. The system 200 also includes a microphone for input from the user. The user may provide a voice input to the system in order to search for virtual reality content associated with the voice input provided by the user. The system 200 may analyze the voice input to determine text associated with the voice input. Optionally, the system 200 present a message to the user asking them to confirm whether the text determined by the system 200 matches the user's voice input. The message may include a number of text options for the user to select as a match for their voice input. These text options may be configured to be a match for at least one of the keywords included in the corpus. If the text is not correct, the user may provide a new input to the system. The system 200 may then use the text to search against the corpus of keywords. The system determines a match or approximate match between the voice input and one or more keywords. The system 200 may present a message to the user asking them to confirm the accuracy of the search (e.g., whether the match is correct). The system 200 may then begin playback of the virtual reality content identified by the voice search.

Hyperlinking Content

In one embodiment, the system 200 includes functionality to enable hyperlinks between different portions of virtual reality content. The system 200 may also include functionality to enable the user to select the hyperlink using their voice or a gesture using their hands, feet, head, eye gaze or some other portion of their body or an object associated with their body. For example, assume the user is watching virtual reality content including an image of the Eiffel Tower. In this experience the Eiffel Tower is a far away object in the background of the scene. The Eiffel Tower may be an object that is hyperlinked to a different virtual reality experience. A graphic, icon, noise or some other call out may indicate that the Eiffel Tower is hyperlinked. Further assume that if the user selects the hyperlink associated with the Eiffel Tower, then the user will be switched to a new virtual reality experience taking place on top of the viewing platform of the Eiffel Tower so that the user is seeing a view of Paris as it appears from atop the Eiffel Tower.

The user may select the hyperlink by gesturing at the Eiffel Tower in a certain way, stamping their foot while looking at the hyperlinked object, saying a reserved keyword or phrase or providing combination of different inputs. In one embodiment, the user may select a hyperlink by saying a reserved keyword or phrase followed by an instruction. For example, the reserved keyword is "Jaunt." The user may say "Jaunt, select the Eiffel Tower." The system 200 will then select the hyperlink associated with the Eiffel Tower presented in the virtual reality content.

In one embodiment, the user may select a hyperlink by gazing at the hyperlink for a predetermined period of time.

In one embodiment, hyperlinks may only be visible by a user when the system 200 is in a mode that enables hyperlinks to be seen by the user.

Virtual Reality Content Network

In one embodiment, the virtual reality content includes a playlist of virtual reality experiences. The play list may be curated by a taste maker, celebrity, expert or some other individual who's opinion may be valued by a user. For example, the playlist may be entitled "The 50 Best Virtual Reality Experiences in Paris!" and include virtual reality content associated with Paris, France.

In one embodiment, the user curates their own playlist. In another embodiment, the user's friends or contacts on the social network create the playlist. The system 200 may enable the user to view and access the playlist created by their friends or contacts. The system may enable users to share their playlists with friends or contacts.

In one embodiment, the user may be able to bookmark portions of virtual reality content. These bookmarks may be included in the user's playlists. The bookmarks may be shared with friends or contacts via the social network.

In one embodiment, a designation portion of the virtual reality content may include controls such a fast forward, rewind, pause, stop, etc. For example, if the user looks down for more than 2 seconds, a panel is revealed that includes the controls. The user may then select the controls using their eye gaze, hands, feet, voice commands, etc. The system may include sensors for foot tracking so that the user can stamp their foot in the real world to select objects such as the controls of the control panel in the virtual reality content. The location of the panel may be static or dynamic. A dynamic panel may include one that appears at any location in the virtual reality content based on context or some other information. For example, if the user gazes in a certain area for two seconds and then says the reserved keyword "Panel," then the panel may appear in the location where the user is gazing.

Time Shifting for Virtual Reality Content

In one embodiment, the system 200 may include the ability to allow the user to time shift while experiencing the virtual reality content. The virtual reality content may be recorded at various times and configured so that a user may shirt to different times while continuing to watch or experience the virtual reality content. For example, a user may be experiencing virtual reality content that features the city of Paris. It is noon and the season appears to be summer. The user may determine that they would prefer to experience Paris at night time. The system 200 may depict a graphical input or have an actual hardware input (e.g., switch, button, slider, touch pad, etc.) that is viewable in the virtual reality content by the user. The user may also provide the input using a gesture, their voice, or other input means described in this application. The user may provide an input to select a new time for the virtual reality content so that Paris is now depicted at night time. Similarly, the user may want to experience Paris in a different season such as winter. The user provides an input so that Paris is now depicted in winter.

Virtual Reality Content for Productivity

In one embodiment, the virtual reality content may be configured to enable the user to be productive while enjoying the virtual reality content. For example, the virtual reality content provided by the system 200 may be a virtual office located on a Tahitian beach or some other location selected by the user. The virtual office may include virtual versions of any office item, including a desk, office chair, phone and computer with monitors, mouse and keyboard. Similarly, these items may exist in the real world and be viewable in the virtual world of the virtual reality content. For example, the laptop depicted in the virtual reality content is the user's real world laptop and is viewable and accessible by the user in the virtual reality content. When the user touches the keys of the laptop in the virtual reality world, he is also touching the keys of his laptop in the real world at the same time. Similarly, the user may have a beverage or food in the virtual world that also exists in the real world.

The computer or phone included in the virtual reality content may be configured by the system 200 so that the user can actually use these objects to interact with the real world or create work product usable or viewable other others in the real world. For example, the user can use the computer in the virtual world to create documents or spreadsheets, read and send emails or perform any other functions which a computer in the real world can provide. The system 200 may include depth maps used by the system 200 to provide haptic feedback for weight and texture when interacting with the virtual office. The system 200 may be configured so that the user can save their work product to a memory of the system 200. For example, when the user types Ctrl-S on their computer in the virtual world, the system 200 saves the content the user created on the computer in the virtual world to a memory of the system 200 in the real word. The system 200 may include functionality to provide environmental effects such as wind in the user's face (e.g., via a fan or some other wind creating device) or mist from the ocean as waves crash against the beach (e.g., via a mist machine or some other mist creating device).

Figure 8A:
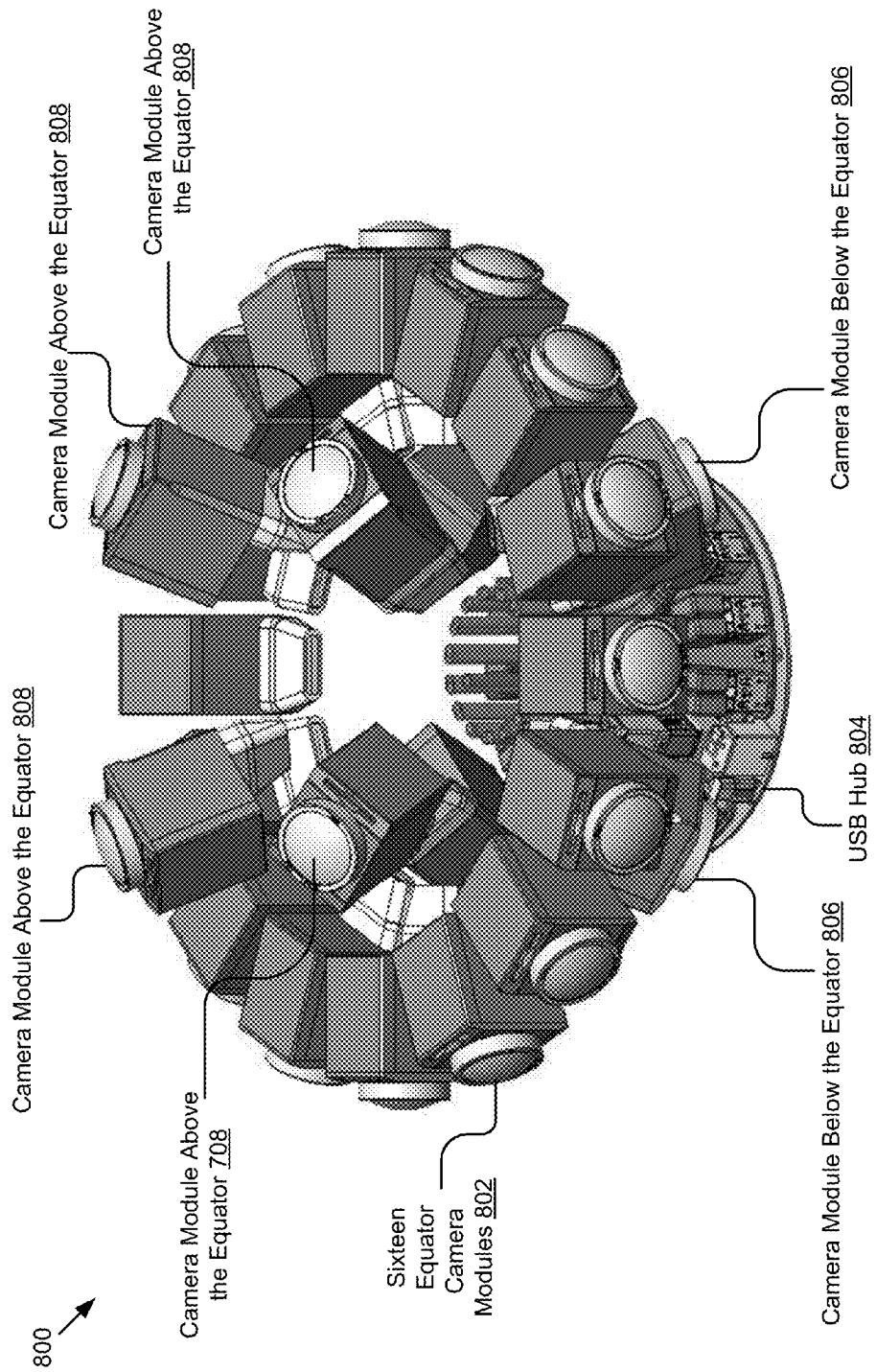
FIG. 8A illustrates a camera array according to some embodiments.

FIG. 8A illustrates a camera array 800 according to some embodiments. The camera array 800 may be an embodiment of the camera array 101 described above with reference to FIG. 1. As such, all descriptions of the camera array 101 may be application to the camera array 800 depicted in FIG. 8A.

The camera array 800 may include twenty four different camera modules 1200. The camera modules 1200 are described in more detail below with reference to FIG. 12 according to some embodiments. One of the camera modules 1200 may include a master camera module. The remaining twenty three camera modules 1200 may include slave camera modules. All descriptions provided above with reference to master and slave configurations of camera modules 103 are also applicable to the camera modules 1200 included in the camera array 800. In some embodiments, the camera modules 1200 are not arranged according to a master-slave configuration as described herein.

For the purpose of clarity, assume that the camera array 800 is arranged as a globe having an equator. The USB hub 804 may be coupled to the camera array 800 at the bottom of the camera array. The USB hub 804 may be configured to be communicatively coupled to the connection hub 123 described above with reference to FIG. 1. Sixteen of the camera modules 1200 may be arranged around the equator of the camera array 800. The equator is the center strip camera modules 1200 that form a belt around the camera array 800. These sixteen camera modules 1200 may be indicated by element 802 of FIG. 8A and referred to collectively as "the equator cameras 802" or individually as "an equator camera 802." The equator cameras 802 may be configured to capture images having a portrait orientation.

The camera array 800 may include four camera modules 1200 configured below the equator cameras 802 as indicated by element 806 and referred to collectively as "the below the equator cameras 806" or individually as "a below the equator camera 806." The below the equator cameras 806 may be configured to capture images having a landscape orientation. The camera array 800 may include four camera modules 1200 configured above the equator cameras 802 as indicated by element 808 and referred to collectively as "the above the equator cameras 808" or individually as "an above the equator camera 808." The above the equator cameras 808 may be configured to capture images having a landscape orientation.

Each of the below the equator cameras 806 may positioned at a pitch of negative sixty-five degrees (−65 degrees) relative to the equator cameras 802 or substantially negative sixty-five degrees relative to the equator cameras 802. Each of the above the equator cameras 808 may be positioned at a pitch of positive sixty-five degrees (+65 degrees) relative to the equator cameras 802 or substantially positive sixty-five degrees relative to the equator cameras 802.

In one embodiment, one or more of the camera modules 1200 included in the camera array 800 may be configured to provide a 3× field of view overlap or a substantially 3× field of view overlap. For example, each pixel recorded by the camera array 800 may be recorded by three different camera modules 1200. The three different camera modules 1200 may be located side-by-side. For example, for each pixel included in the 3D video generated by the system 200 described above with reference to FIG. 2, three of the equator camera modules 802 may record their own set of video data for that particular pixel. The video data for these three different equator camera modules 802 may then be used to generate panoramas for generating the 3D video which includes the pixel.

For example, the content system 131 may include code and routines configured to stitch one or more image frames (e.g., selected from the video data) to form a panorama including the pixel. The pixel may be captured by three different video modules 1200 configured to provide a 3× field of view overlap. Each of the three different camera modules 1200 may capture a separate image frame that includes the pixel from a different perspective. As a result, the content system 131 may have three different image frames (i.e., three different candidate sets of video data) to select from when forming the panorama including the pixel. The image frames may be stitched together by the content system 131 based on a relative position of each camera module 1200. When selecting among the candidate image frames for depicting the pixel, the content system 131 may include code and routines configured to select the image frame that would result in the least amount of stitching artifacts, ghosting or other stitching aberrations associated with low quality 3D video. A simplified example of this concept is described in more detail below with reference to FIG. 8B.

In one embodiment, the camera array 800 may include sixteen different camera modules 1200. For example, the camera array 800 may include sixteen equator cameras 802 but not the four above the equator cameras 808 or the four below the equator cameras 806.

In this embodiment, one or more of the equator cameras 802 may have a field of view overlap of 2× to 3×. The sixteen equator cameras 802 may be synchronized and configured to capture one or more stereoscopic images. Each stereoscopic image may be associated with the equator camera 802 which captured that image. The sixteen equator cameras 802 may be synchronized for time so that they each capture a stereoscopic image at the same time or substantially the same time. Each stereoscopic image may be associated with a timestamp indicating when the image was captured. The synchronization of the sixteen equator camera modules 802 may be configured so that the camera array 800 captures a three hundred and sixty degree view of an environment where the camera array 800 is located. The timestamps and the association of each stereoscopic image with the equator camera 802 which captured that image may be used by the by the content system 131 to process the data describing the stereoscopic images to generate 3D video content.

In one embodiment, the content system 131 may generate the three-dimensional video by stitching the stereoscopic images together to generate three-dimensional video that depicts the environment where the camera array 800 is located. For example, the camera array 800 stitches the stereoscopic images together by identifying, for each stereoscopic image, which of the sixteen equator camera modules 802 captured the stereoscopic image and the time when the stereoscopic image was captured so that, for a given time frame, at least sixteen stereoscopic images are identified as having been captured at substantially the same time. The stereoscopic images may then be stitched together in an order corresponding to arrangement of the sixteen equator camera modules 802 around the equator of the camera array 800 so that the stitched stereoscopic images form the three hundred and sixty degree view of the environment.

In one embodiment, the 3D video content may include a virtual tour for a classroom. For example, students in a class may view the 3D video content to virtually tour an environment selected by a teacher or instructor of the class.

In one embodiment, the system 100 may include a plurality of client devices 127 which each include their own content system 131 and the plurality of client devices 127 may work together so that they process the stereoscopic images quicker, more efficiently, or to produce images including less stitching errors. The 3D video content may then be stored to a video server. The video server may be communicatively coupled to the network 105. The 3D video content may be indexed by the video server. The video server may include a search engine. Users may access the video server to search for, identity and view the 3D video content.

Figure 8B:
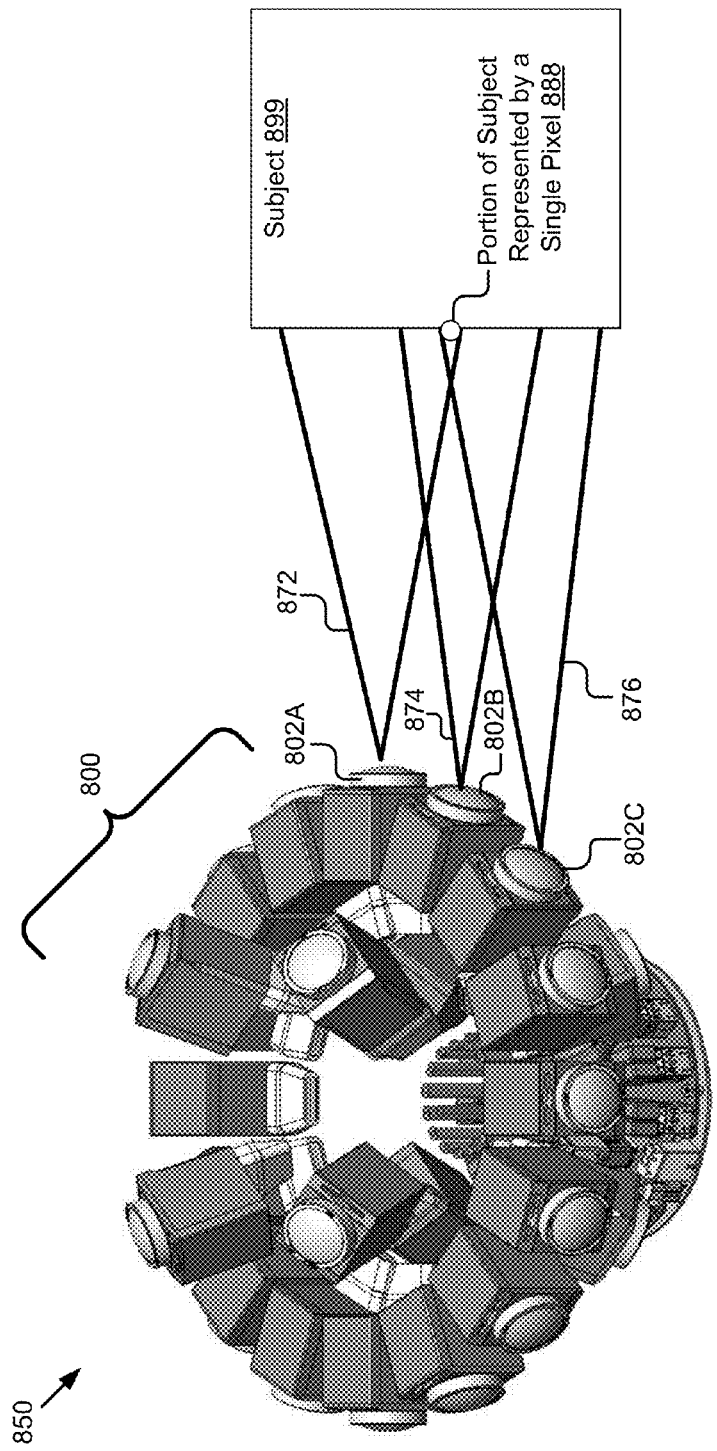
FIG. 8B illustrates an example operating environment including a camera array recording a subject according to some embodiments.

FIG. 8B illustrates an example operating environment 850 including a camera array 800 recording a subject 899 according to some embodiments. Assume the subject 899 is being recorded by the camera array 800. The subject 899 may include one or more portions such as portion 888. Portion 888 is the amount of the subject 899 that is represented by a single pixel in the 3D video content generated when the camera array 800 records the subject 899 and the content system 131 processes the video data generated from this recording. For example, the content system 131 processes the video data in accordance with method 700 described above with reference to FIG. 7.

The camera modules 1200 of the camera array 800 are configured to provide a 3× field of view overlap. For example, the camera modules 1200 are configured so that each pixel included in the 3D video content is recorded by three different camera modules 1200. Here, the portion 888 is being recorded by a first equator camera 802A, a second equator camera 802B and a third equator camera 802C. Element 872 includes the field of view for the first equator camera 802A. Element 874 includes the field of view for the second equator camera 802B. Element 876 includes the field of view for the third equator camera 802C. Each of these fields of view captures the portion 888. In this way, the content system 131 has three different sets of video data (one for each camera 802A, 802B, 802C) to select from when creating the pixel included in the 3D video that represents the portion 888.

Experimentation has shown that this configuration provides numerous benefits, including a decrease in stitching artifacts, ghosting or other stitching aberrations associated with low quality 3D video. For example, when two stereoscopic images from adjacent cameras 802A and 802B are stitched together, the region associated with the border of these two stereoscopic images may have a stitching artifact. However, experimentation has shown that a configuration of the cameras 802, 802B to provide a 3× field of view overlap reduces, minimizes or eliminates instances of such stitching artifacts.

Figure 9A:
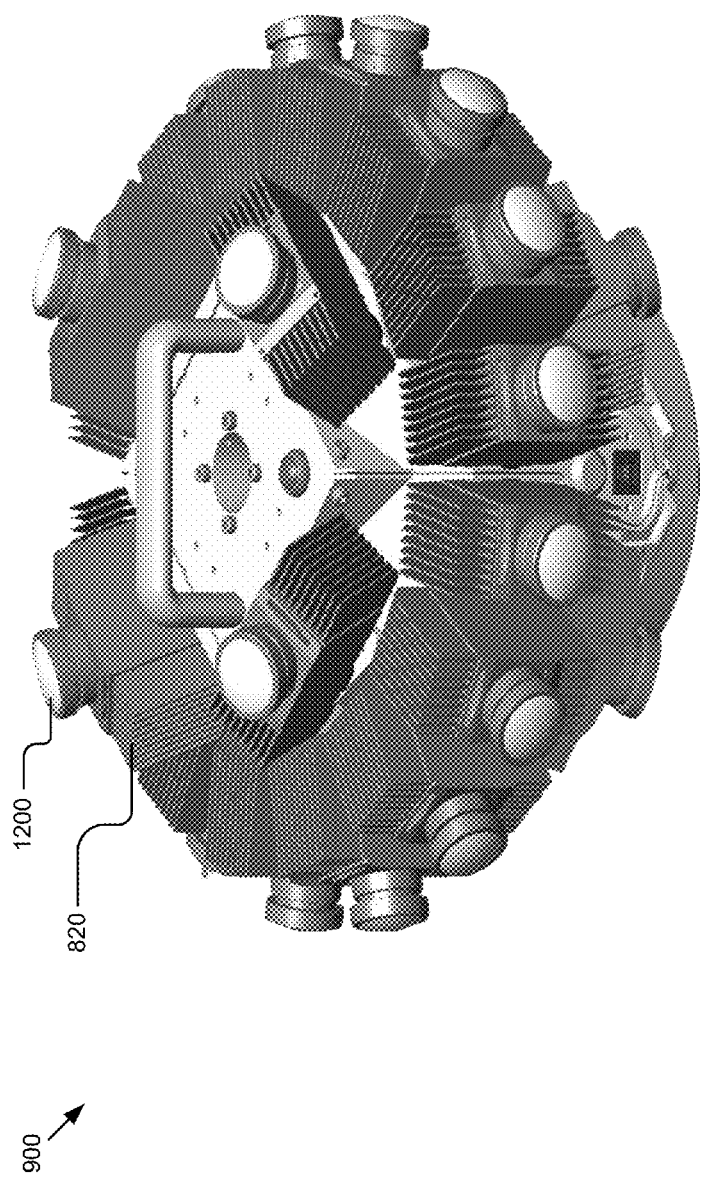
FIG. 9A illustrates a camera array having camera modules including heat dissipation elements according to some embodiments.

FIG. 9A illustrates a camera array 900 according to some embodiments. Here, each of the camera modules 1200 may include a heat dissipation element 902. The heat dissipation element 902 may include a heat sink or some other device coupled to the camera module 1200 and configured to dissipate the heat of the camera module 1200 or the neighboring camera modules 1200.

The camera array 900 may be an embodiment of the camera array 101 described above with reference to FIG. 1. As such, all descriptions of the camera array 101 may be applicable to the camera array 900 depicted in FIG. 9A.

The camera array 900 includes twenty four different camera modules 1200. One of the camera modules 1200 may include a master camera module. The remaining twenty three camera modules 1200 may include slave camera modules. All descriptions provided above with reference to master and slave configurations of camera modules 103 are also applicable to the camera modules 1200 included in the camera array 900.

Figure 9B:
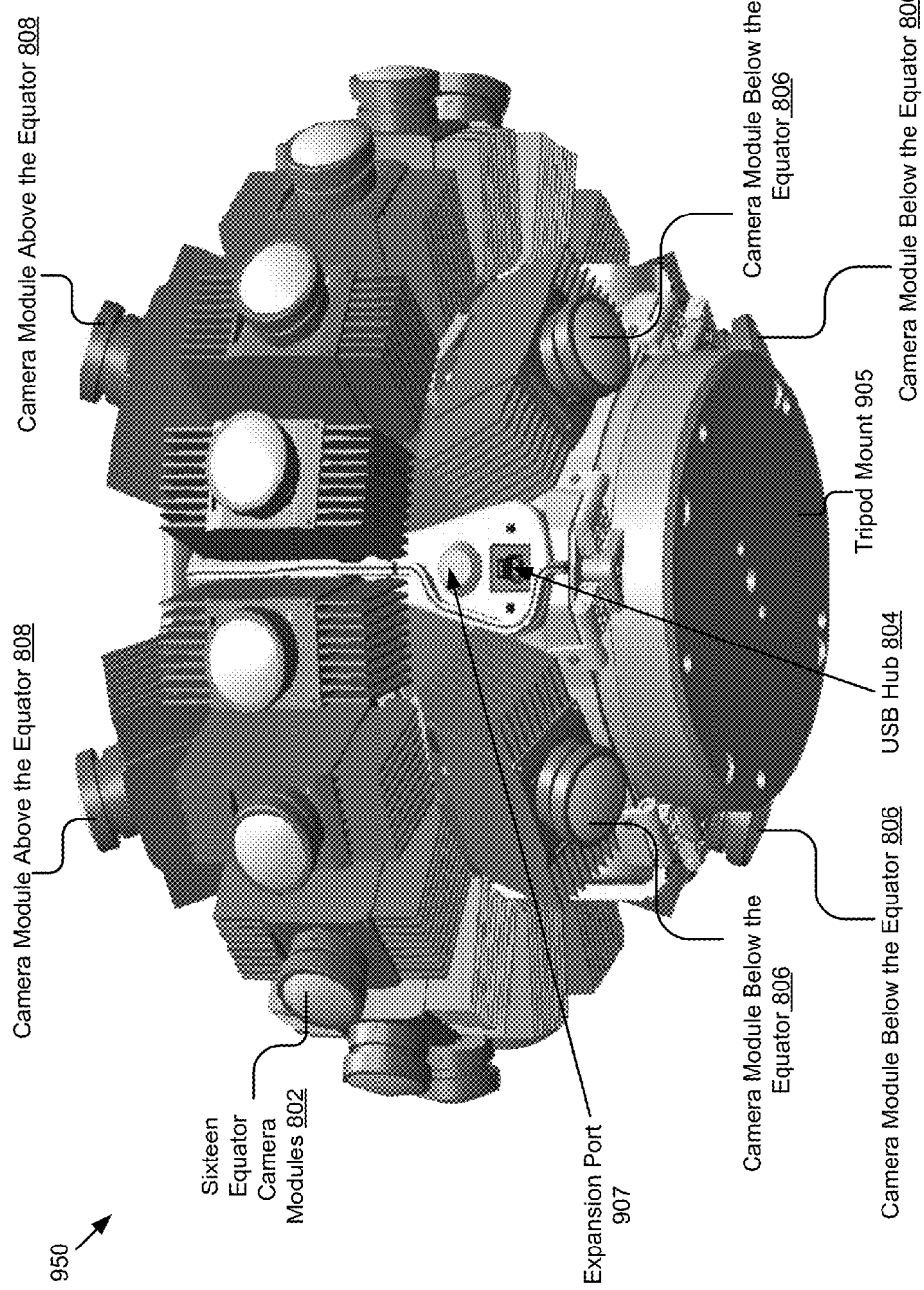
FIG. 9B illustrates a camera array according to some embodiments.

FIG. 9B illustrates a camera array 950 according to some embodiments. Compared to FIG. 8A, camera array 950 is positioned so that all four of the camera modules below the equator 806 are visible.

The camera array 950 may include a tripod mount 905. The tripod mount 905 may include a standard tripod mount or a boom tripod mount.

The camera array 950 may include an expansion port 907. The expansion port 907 may include hardware or software configured to enable the camera array 950 to be communicatively coupled to one or more of the following accessories: a wired remote configured to provide inputs to the camera array 950 to control or configure the camera array 950; a wireless dongle configured to enable the camera array 950 to receive inputs from, and provide outputs to, one or more devices via Bluetooth™, Bluetooth LE, WiFi or any other wireless communication including the network 105; a touch panel display configured to provide inputs to the camera array 950 to control or configure the camera array 950, etc.

The expansion port 907 may include one or more communicative couplings. The expansion port 907 may include one or more pins. For example, the expansion port 907 may include one or more electrical contact pins.

The accessories listed above may include one or more hardware communicative coupling devices. For example, an accessory may include a hardware bus. The hardware bus may correspond to one or more protocols or standards. For example, the hardware bus may include one or more of the following: USB port (e.g., USB 2.0, 3.0 or Type-C); a High-Definition Multimedia port; a Lightning connector; or any other hardware bus that is similar or derivative of those described above.

The expansion port 907 may include a male or female port corresponding to the one or more of the accessories listed above. The expansion port 907 may include software or other hardware necessary to provide its functionality. For example, the expansion port 907 may include an application programming interface and a signal line configured to provide a communicative coupling to the bus 220 described above with reference to FIG. 2.

Although not depicted in FIG. 9B, the camera array 950 may include one or more of the following features: a carrying handle or strap; one or more straight power cables; one or more right angle power cables; a power switch; and a record button.

The camera array 950 may be an embodiment of the camera array 101 described above with reference to FIG. 1. As such, all descriptions of the camera array 101 may be applicable to the camera array 950 depicted in FIG. 9B.

The camera array 950 includes twenty four different camera modules 1200. One of the camera modules 1200 may include a master camera module. The remaining twenty three camera modules 1200 may include slave camera modules. All descriptions provided above with reference to master and slave configurations of camera modules 103 are also applicable to the camera modules 1200 included in the camera array 950.

Figure 10:
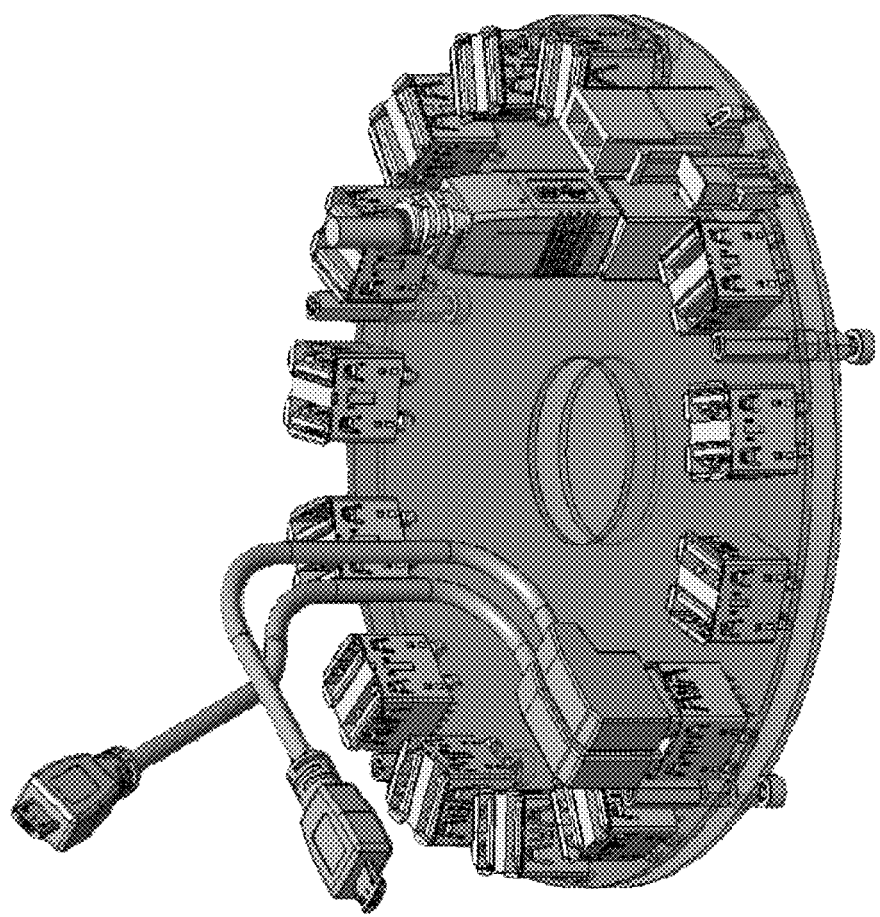
FIG. 10 illustrates the universal serial bus hub according to some embodiments.

FIG. 10 illustrates the USB hub 804 according to some embodiments. The USB hub 804 may include one or more USB ports. The USB ports may include one or more of the following: a USB 2.0 port; a USB 3.0 port; a USB-C port; or any other type of USB port that is a derivative of USB 2.0, USB 3.0 or USB-C.

Figure 11:
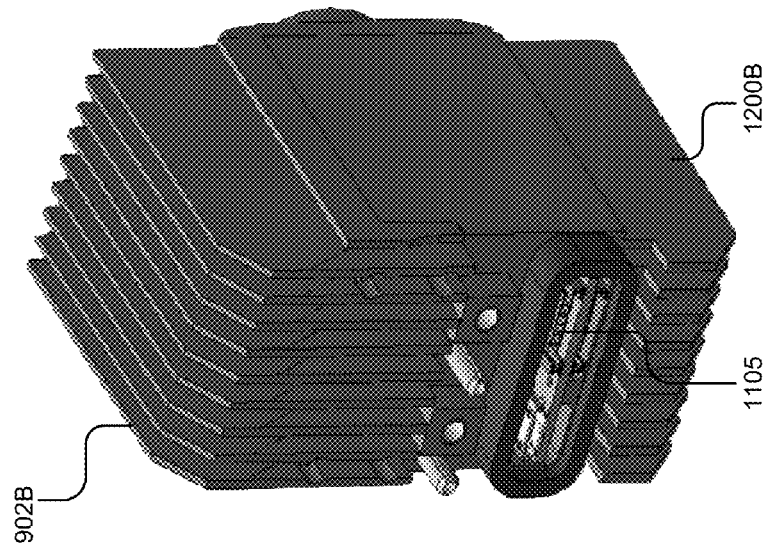
FIG. 11 illustrates camera modules including heat dissipation elements.
Figure 11:
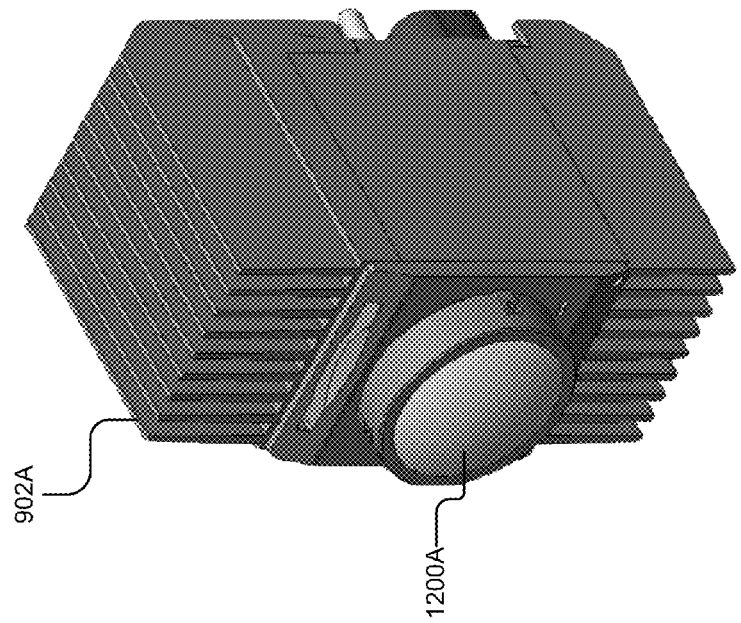

FIG. 11 illustrates camera modules 1200A, 1200B including heat dissipation elements 902A, 902B. The first camera module 1200A is positioned to provide a front facing view of the first camera module 1200A. The second camera module 1200B is positioned to provide a rear facing view of the second camera module 1200B. From the rear facing view, the USB and daisy chain port 1105 of the second camera module 1200B are viewable. The camera modules 1200A, 1200B may be embodiments of the camera module 1200 described below with reference to FIG. 12 according to some embodiments.

Figure 12:
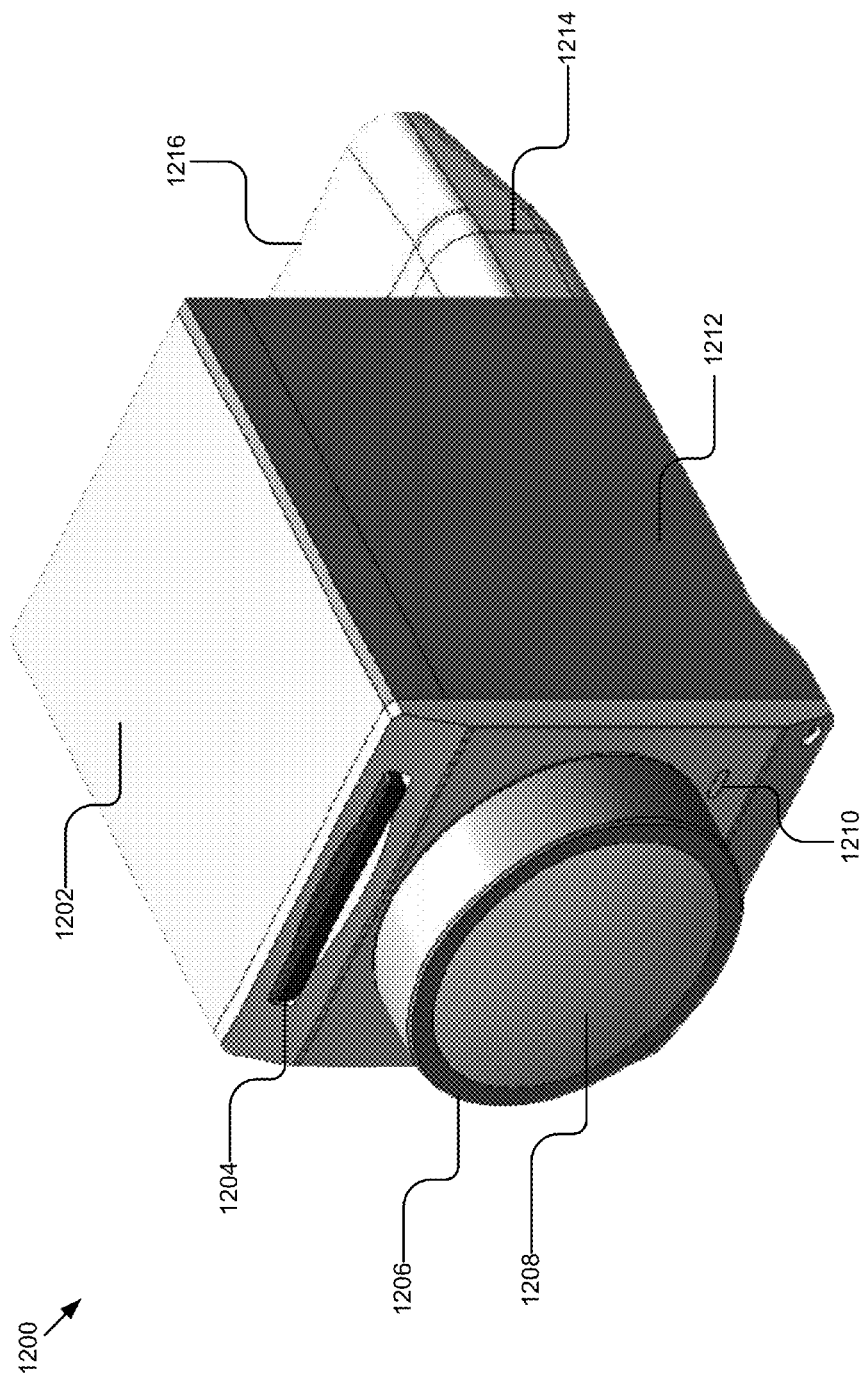
FIG. 12 illustrates a camera module according to some embodiments.

FIG. 12 illustrates a camera module 1200 according to some embodiments. The camera module 1200 may be an embodiment of the camera module 103. As such, all descriptions of the camera module 103 may be applicable to the camera module 1200.

The camera module 1200 may include one or more of the following elements: a housing cover 1202; an external SD card reader 1204; a lens mount 1206; a lens 1208; an indicator light emitting diode (LED) 1210; a housing body 1212; a protective boot 1214 for protecting USB and daisy chain cables; and an outlet 1216 for the USB and daisy chain cables to enter and exit the protective boot 1214. The camera module 1200 may also include a microphone built into the front of the housing body 1212 on the same side of the housing body 1212 that includes the lens 1208. The microphones may include soundfield microphones. In this way, an array of camera modules 1200 may also include an array of microphones.

In one embodiment, the camera module 1200 may record in at least 1080p video (otherwise known as Full HD video). As described above with reference to FIGS. 8A, 8B, 8C and 9, the camera module 1200 may be an element of a camera array such as camera array 800 described above with reference to FIG. 8A. The camera array may include twenty four different camera modules 1200. In one embodiment, each of the camera modules 1200 included in the camera array may record up to one hundred twenty frames per second (120 frames per second). In one embodiment, the camera modules 1200 may record in a range of sixty frames per second to one hundred eighty frames per second (60 frames per second to 180 frames per second).

In one embodiment, the camera module 1200 includes a camera sensor (not pictured). The sensor may include a complementary metal-oxide-semiconductor sensor (CMOS sensor). The sensor may include a CMOS sensor having 2.3 megapixels and a global shutter feature. The sensor may include a CMOS sensor having 20 megapixels and a rolling shutter. The sensor may include one or more of the following features: global shutter; still image; 1920×1200 graphics display resolution at sixty frames per second (60 frames per second); 1920×1200 graphics display resolution at ninety frames per second (90 frames per second); 1920×1080 at one hundred twenty frames per second (120 frames per second); hardware or software configured to provide lens-to-sensor thread-based focus adjustment; and hardware or software configured to provide lens-to-sensor active alignment.

In one embodiment, the camera module 1200 may include a camera system on chip (SOC) image signal processor.

In one embodiment, the camera module 1200 may include one or more of the following features: a microphone integrated in the housing cover 1202 or the housing body 1212; an integrated and weatherproof USB hub; one or more USB 2.0 ports; one or more USB 3.0 ports; one or more USB-C ports; a communication unit similar to the communication unit 245 described above with reference to FIG. 2 and configured to provide the camera module 1200 with wired and wireless communication functionality; a wired remote for controlling the functionality of one or more camera modules 1200; onboard mobile double data rate (mobile DDR) memory such as LPDDR2 or any other DDR variation; an electrically erasable programmable read-only memory (EEPROM) configured to provide per-unit calibration; one or more upstream universal asynchronous receiver/transmitter (UART) devices or modules which may implement the camera-to-camera messaging protocol; one or more downstream UART devices or modules; hardware or software for providing self-generated horizontal synchronization (HSYNC) and self-generated vertical synchronization (VSYNC) signals; a real time clock having a battery capacity of six or more days; one or more three-axis accelerometers; and three or more temperature sensors (e.g., two on the main board, and one on the sensor board).

In one embodiment, the external SD card reader 1204 may be configured to be weatherproof. The external SD card reader 1204 may include one or more gaskets or O-rings configured so that the external SD card reader 1204 is waterproof up to ten atmospheres. In one embodiment, the external SD card reader 1204 may be a full size SD card reader. The external SD card reader 1204 may be fully accessible from the outside of the camera module 1200 so that the camera module 1200 does not have to be removed from the camera array.

In one embodiment, the lens 1208 may include a wide-angle lens. The lens 1208 may include a one hundred and thirty degree field of view (130 degree field of view). Optionally, the lens 1208 may include a field of view being substantially one hundred and thirty degrees. The lens 1208 may include a one hundred and ten degree horizontal field of view (110 degree horizontal field of view). Optionally, the lens 1208 may include a horizontal field of view being substantially one hundred and ten degrees. The lens 1208 may include a seventy degree vertical field of view (70 degree vertical field of view). Optionally, the lens 1208 may include a vertical field of view being substantially seventy degrees. The lens 1208 may include a 13.268 millimeter image circle. Optionally, the lens 1208 may include an image circle being substantially 13.268 millimeters. The lens 1208 may include an f-number of f/2.9. The lens 1208 may include a sixty-five centimeter (65 centimeter) to infinity depth field of view. Optionally, the lens 1208 may include a depth field being substantially sixty-five centimeters to infinity. The lens 1208 may be configured to include fisheye distortion. The lens 1208 may be configured to include an optical low-pass filter. The lens 1208 may be mounted to include a lens protection cap.

In one embodiment, the indicator light LED 1210 may include a tri-color LED indicator. The camera module 1200 or the camera array may include code and routines such as firmware to provide the following functionality for the indicator light LED 1210 to indicate the status of the camera module 1200: power-up indication; boot process indication; ready-to-record or standby indication; recording indication;

and one or more error states (e.g., SD card is missing, SD card is full, heartbeat signal is missed for camera synchronization, etc.).

In one embodiment, the housing bodying 1212 and the protective boot 1214 may be configured to be weatherproof or waterproof.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

What is claimed is:

1. A method comprising:
   recording a compressed stream of video data describing a scene using a camera array, the camera array including a set of camera modules that are configured to provide at least a 2× field of view overlap so that each pixel included in the scene is described by a subset of the compressed stream of video data captured by two different camera modules included in the set of camera modules;
   recording a stream of three-dimensional audio data associated with the scene using an array of soundfield microphones;
   generating virtual reality content based on the compressed stream of video data and the stream of three-dimensional audio data, wherein the virtual reality content depicts the scene;
   receiving viewing data that describes a location of a first user's gaze while viewing the virtual reality content;
   determining an object of interest to the first user in the virtual reality content based on the location of the first user's gaze; and
   performing an action in the social network related to the object of interest, wherein the action includes preventing disclosure of at least one of private and embarrassing information by:
      determining a category associated with the object of interest;
      comparing the category to a list of user-approved subject matter to determine whether the category is in the list, wherein the list of user-approved subject matter is subject matter that is not sensitive to the user; and
      responsive to the category being in the list, automatically generating a social network update that describes an interaction of the first user with the virtual reality content based on the viewing data.

2. The method of claim 1, wherein performing the action in the social network further includes:
   identifying one or more second users in the social network that are associated with the object of interest; and
   suggesting a connection between the first user and the one or more second users in the social network.

3. The method of claim 1, wherein performing the action in the social network further includes comprises:
   identifying one or more second users in the social network that are associated with the object of interest; and
   inviting the one or more second users to join the first user in interacting with the virtual reality content.

4. The method of claim 1, wherein performing the action in the social network further comprises:
   providing the social network update to one or more second users that are connected to the first user via a social graph.

5. The method of claim 1, wherein performing the action in the social network further comprises:
   determining one or more advertisements that correspond to the category;
   providing the one or more advertisements as part of the virtual reality content; and
   updating a user profile associated with the first user to include information about at least one of the category and the one or more advertisements.

6. The method of claim 5, further comprising storing information in a social graph about the first user's gaze at advertisements displayed as part of the virtual reality content.

7. The method of claim 1, wherein performing the action in the social network further comprises:

suggesting a group associated with the social network based on the category.

8. The method of claim 1, further comprising transmitting instructions to physical hardware to vibrate to provide physical stimulation.

9. The method of claim 1, wherein determining the object of interest is based on a heat map that measures the first user's gaze at different locations in the virtual reality content and illustrates the user's gaze with different colors based on a length of time the first user spent looking at the different locations.

10. A method comprising:
recording image data describing a scene using a camera array including a set of camera modules that are configured to provide at least a 2× field of view overlap so that each pixel included in the scene is described by a subset of the image data captured by two different camera modules included in the set of camera modules;
recording a stream of three-dimensional audio data associated with the scene using an array of soundfield microphones;
providing virtual reality content that includes a compressed stream of three-dimensional video data that is based on the image data and the stream of three-dimensional audio data with a processor-based computing device programmed to perform the providing;
determining locations of user gaze of the virtual reality content;
generating a heat map that includes different colors based on a number of user gazes for each location; and
automatically providing a first user that is viewing the virtual reality content with a recommendation to look at one or more of the locations in the virtual reality content based on the heat map, wherein the recommendation is at least one of an audio cue, a visual cue, and a combination of the audio cue and the visual cue.

11. The method of claim 10, further comprising generating a playlist of virtual reality experiences based on most user views of virtual reality content.

12. The method of claim 10, further comprising generating a playlist of virtual reality experiences based on a geographical location.

13. The method of claim 10, further comprising generating a playlist of virtual reality experiences, wherein the playlist is generated by a second user that is an expert in subject matter that is in the virtual reality content and the playlist is based on the subject matter.

14. The method of claim 10, wherein the recommendation is the visual cue and the visual cue includes blurring the virtual reality content except for the one or more locations associated with the recommendation.

15. The method of claim 10, wherein the recommendation includes one or more avatar heads that behave in a way that, responsive to being mimicked by the user, result in the user viewing the one or more locations associated with the recommendation.

16. A method comprising:
recording image data describing a scene using a camera array including a set of camera modules that are configured to provide at least a 2× field of view overlap so that each pixel included in the scene is described by a subset of the image data captured by two different camera modules included in the set of camera modules;
recording a stream of three-dimensional audio data associated with the scene using an array of soundfield microphones;

generating, with one or more processors, virtual reality content that includes a stream of three-dimensional video data that is based on the image data and the stream of three-dimensional audio data;
providing the virtual reality content to a user;
receiving viewing data that includes a location of the user's gaze while viewing the virtual reality content;
determining the location of the user's gaze;
determining a category associated with an object of interest that is within the location of the user's gaze;
determining one or more first advertisements that correspond to the category;
generating graphics for displaying at least one of a bottom portion that is located below feet of the user and a top portion is located above a head of the user in a three-dimensional world; and
providing the one or more first advertisements to display in at least one of the bottom portion and the top portion of the three-dimensional world.

17. The method of claim 16, further comprising:
receiving a social network profile for the user that includes one or more user interests;
wherein determining the one or more first advertisements is further based on the one or more user interests.

18. The method of claim 16, further comprising:
analyzing the virtual reality content to identify a stitching aberration in the virtual reality content;
incorporating a second advertisement into the virtual reality content such that the stitching aberration is not visible; and
providing the virtual reality content with the second advertisement to the user.

19. The method of claim 16, further comprising:
determining a cost for displaying one or more second advertisements based on a location of the one or more second advertisements in the virtual reality content and the category associated with the one or more second advertisements; and
suggesting a second advertisement from the one or more second advertisements based on the cost for displaying each of the one or more second advertisements.

20. The method of claim 19, wherein determining the cost for displaying each of the one or more ft advertisements is further based on a length of time that the user gazes at the location.

21. The method of claim 19, further comprising:
providing a graphical object as part of the virtual reality content that is linked to a second advertisement;
receiving a selection of the second advertisement from the user; and
generating a pop-up window in the virtual reality content that relates to the second advertisement or providing access to a third-party website that relates to the second advertisement.

22. The method of claim 19, further comprising:
determining locations of user gaze of the virtual reality content;
generating a heat map that determines different areas of interest based on a number of user gazes for each location; and
determining a fee for displaying a second advertisement in each area of interest associated with the heat map.

* * * * *